(12) United States Patent
Gima

(10) Patent No.: US 12,076,961 B2
(45) Date of Patent: Sep. 3, 2024

(54) LAMINATED GLASS

(71) Applicant: AGC Inc., Tokyo (JP)

(72) Inventor: Yuhei Gima, Tokyo (JP)

(73) Assignee: AGC INC., Tokyo (JP)

( * ) Notice: Subject to any disclaimer, the term of this patent is extended or adjusted under 35 U.S.C. 154(b) by 786 days.

(21) Appl. No.: 17/171,647

(22) Filed: Feb. 9, 2021

(65) Prior Publication Data

US 2021/0162716 A1     Jun. 3, 2021

Related U.S. Application Data

(63) Continuation of application No. PCT/JP2019/027360, filed on Jul. 10, 2019.

(30) Foreign Application Priority Data

Aug. 21, 2018 (JP) ................. 2018-154917

(51) Int. Cl.
*B32B 17/10* (2006.01)
*B32B 17/06* (2006.01)
*H05B 3/86* (2006.01)

(52) U.S. Cl.
CPC ...... *B32B 17/10385* (2013.01); *B32B 17/061* (2013.01); *B32B 17/10036* (2013.01);
(Continued)

(58) Field of Classification Search
CPC . H05B 3/84; H05B 3/845; H05B 3/86; H05B 2203/007; H05B 2203/014;
(Continued)

(56) References Cited

U.S. PATENT DOCUMENTS

| 5,070,230 A | 12/1991 | Osada et al. |
| 5,798,499 A | 8/1998 | Shibata et al. |

(Continued)

FOREIGN PATENT DOCUMENTS

| JP | H06-318492 A | 11/1994 |
| JP | H08-72674 A | 3/1996 |

(Continued)

OTHER PUBLICATIONS

International Searching Authority, "International Search Report," issued in connection with International Patent Application No. PCT/JP2019/027360, dated Oct. 15, 2019.

(Continued)

*Primary Examiner* — Brian W Jennison
(74) *Attorney, Agent, or Firm* — Foley & Lardner LLP

(57) ABSTRACT

Laminated glass includes a pair of glass plates, an intermediate film positioned between the glass plates, an electrically conductive heating material positioned between the glass plates and having a surface in contact with the intermediate film, a first bus bar and a second bus bar connected to the electrically conductive heating material and positioned between the glass plates, disposed such that the electrically conductive heating material is interposed therebetween in a plan view, third bus bars positioned between the glass plates, and connecting the first and second bus bars to a pair of electrode leads, and a fourth bus bar at least partly positioned between the glass plates, and superposed on a part of at least one of the first to third bus bars, wherein the electrically conductive heating material, the first to the third bus bars are integrally formed of a same material.

14 Claims, 12 Drawing Sheets

(52) U.S. Cl.
CPC ......... *B32B 17/10183* (2013.01); *H05B 3/86* (2013.01); *B32B 2307/202* (2013.01); *B32B 2605/006* (2013.01); *H05B 2203/007* (2013.01); *H05B 2203/014* (2013.01)

(58) Field of Classification Search
CPC ............ B32B 17/061; B32B 17/10385; B32B 17/10036; B32B 2307/202; B32B 2605/006
See application file for complete search history.

(56) References Cited

U.S. PATENT DOCUMENTS

| | | |
|---|---|---|
| 2015/0343744 A1* | 12/2015 | Ogawa .............. B32B 17/10761 219/201 |
| 2017/0135155 A1 | 5/2017 | Klein et al. |
| 2017/0223779 A1 | 8/2017 | Suetsugu et al. |
| 2018/0187380 A1* | 7/2018 | Naylor ................... H05B 3/342 |

FOREIGN PATENT DOCUMENTS

| | | |
|---|---|---|
| JP | 2011-210487 A | 10/2011 |
| JP | 2016-128370 A | 7/2016 |

OTHER PUBLICATIONS

International Searching Authority, "Written Opinion," issued in connection with International Patent Application No. PCT/JP2019/027360, dated Oct. 15, 2019.

* cited by examiner

LAMINATED GLASS

CROSS-REFERENCE TO RELATED APPLICATIONS

This application is a continuation of International Application PCT/JP2019/027360, filed on Jul. 10, 2019, and designated the U.S., which is based on and claims priority to Japanese patent application No. 2018-154917 filed on Aug. 21, 2018. The entire contents of these applications are incorporated herein by reference.

BACKGROUND OF THE INVENTION

Field of the Invention

The present invention relates to laminated glass.

Description of the Related Art

As window glass for an automobile or a railway vehicle, it is known to apply laminated glass (also referred to as an electrically heating window glass or an electrically heating glass) having an electrically conductive heating material (such as a plurality of resistive heating wires) sandwiched between a pair of glass plates. With this laminated glass, it is possible to dissipate fog from window glass or to eliminate freezing of moisture attached to window glass in winter, by letting the electrically conductive heating material generate heat.

Such laminated glass usually includes a pair of glass plates, an intermediate film sandwiched between the pair of glass plates, a first bus bar provided at one end between the pair of glass plates, a second bus bar provided at the other end between the pair of glass plates, an electrically conductive heating material provided between the first bus bar and the second bus bar, and third bus bars connecting the first bus bar and the second bus bar to an extracted portion of the electrode. The electrically conductive heating material is disposed at a see-through area excluding the periphery of the laminated glass.

As laminated glass provided with an electrically conductive heating material, one wherein an intermediate film having a thin resistive heating wire made of tungsten embedded therein, is disposed between a pair of glass plates (e.g. Patent Literature 1), one having a transparent electrically conductive coating layer formed on glass (e.g. Patent Literature 2), or one wherein a pattern sheet having an electrically conductive pattern provided on a substrate, is disposed between a pair of glass plates (Patent Literature 3), is known. Furthermore, as an electrically conductive heating material, one having an electrically conductive portion formed on a transparent film substrate (Patent Literature 4) is known.

- Patent Document 1: JP-A-H8-72674
- Patent Document 2: JP-A-H6-318492
- Patent Document 3: JP-A-2016-128370
- Patent Document 4: JP-A-2011-210487

In the conventional laminated glass provided with an electrically conductive heating material, a low resistance metal is employed for a first bus bar, a second bus bar, and a third bus bar in order to sufficiently secure the heat quantity of the electrically conductive heating material disposed at a see-through area of the glass plate.

A first bus bar, a second bus bar, and a third bus bar are usually disposed so as to be concealed by a shielding layer (such as a black ceramic layer) formed on the periphery of the glass plate for appearance design. However, the width of the shielding layer tends to become smaller in accordance with the improvement of the designability of window glass in recent years. As the width of the shielding layer becomes small, the width of the first bus bar, the second bus bar, and the third bus bar also become small. Consequently, since the resistance values of the first bus bar, the second bus bar, and the third bus bar are increased and heat generation loss in the first bus bar, the second bus bar, and the third bus bar is increased, the heat generation efficiency of the electrically conductive heating material is reduced.

SUMMARY OF THE INVENTION

The present disclosure has been made in the view of the above information and has an object to provide laminated glass with improved heat generation efficiency of the electrically conductive heating material.

The present disclosure provides laminated glass that includes a pair of glass plates facing each other, an intermediate film positioned between the pair of glass plates, an electrically conductive heating material positioned between the pair of glass plates and having a surface in contact with the intermediate film, a first bus bar and a second bus bar connected to the electrically conductive heating material and positioned between the pair of glass plates, disposed such that the electrically conductive heating material is interposed between the first bus bar and the second bus bar in a plan view, third bus bars at least partly positioned between the pair of glass plates, and connecting the first bus bar and the second bus bar to a pair of electrode leads, and a fourth bus bar at least partly positioned between the pair of glass plates, and disposed so as to be superposed on an area of at least a part of at least one of the first bus bar, the second bus bar, and the third bus bars, wherein the electrically conductive heating material, the first bus bar, the second bus bar, and the third bus bars are integrally formed of a same material.

According to one embodiment of the present disclosure, laminated glass with the improved heating efficiency of the electrically conductive heating material can be provided.

DESCRIPTION OF THE PREFERRED EMBODIMENTS

Hereinafter, embodiments according to the present disclosure will be described with reference to the drawings. In the following drawings, with respect to the same or similar components, an explanation will be made by using the same reference symbols and duplicate explanation may be omitted. Furthermore, in the following drawings, the size and shape may be partially exaggerated so that the content of the present disclosure can be easily understood.

Hereinafter, a windshield for a vehicle will be described as an example, but the present disclosure is not limited to this, and the laminated glass according to the embodiment may be applied to other than the windshields for vehicles. Furthermore, the term "vehicle" typically refers to an automobile but also refers to a moving object with glass including a train, a ship, an aircraft, and the like.

Furthermore, a plan view refers to viewing a predetermined area of the windshield from the direction normal to the predetermined area, and a planar shape refers to a shape of the predetermined area of the windshield viewed from the direction normal to the predetermined area.

First Embodiment

Figure 1A:
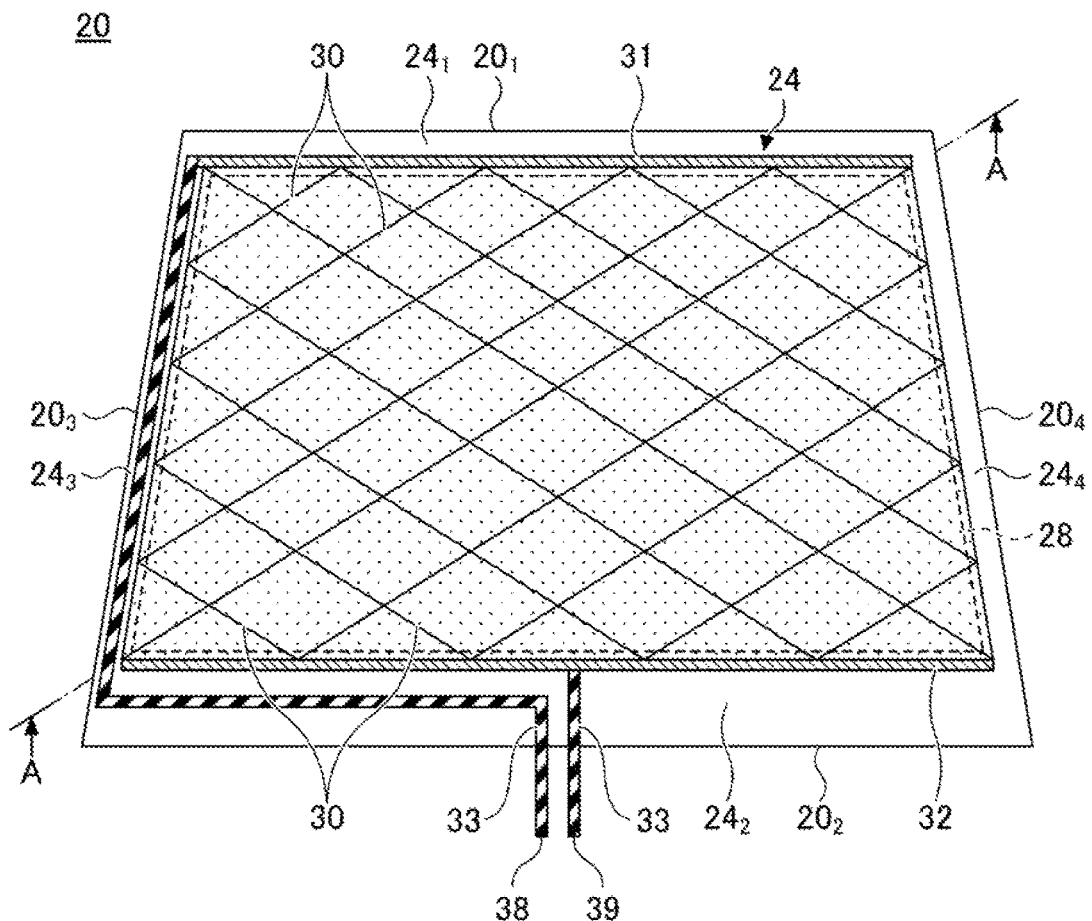
FIGS. 1A and 1B are diagrams (No. 1) illustrating a windshield for a vehicle according to the first embodiment.
Figure 1B:
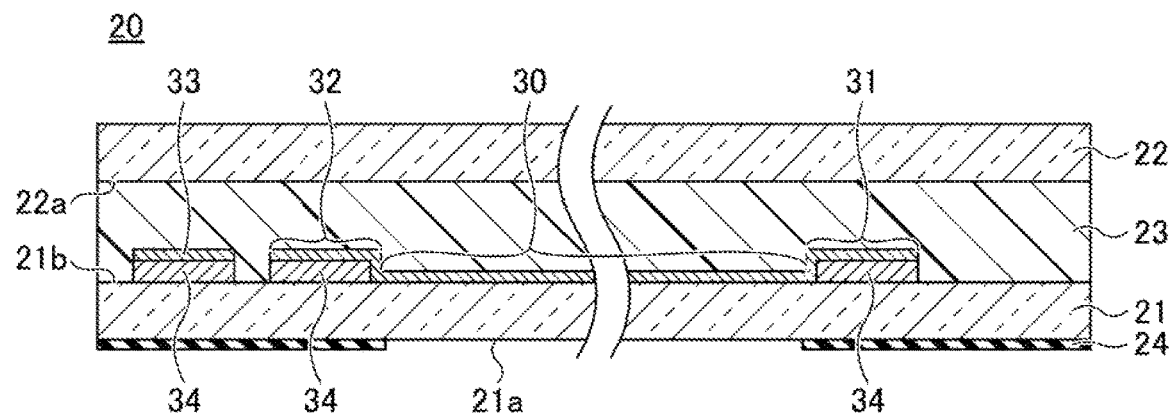

FIGS. 1A and 1B are a diagram (No. 1) illustrating a windshield for a vehicle according to the first embodiment. FIG. 1A schematically illustrates a state in which the windshield is visually recognized from the inside of a vehicle to the outside of the vehicle. FIG. 1B is a partially enlarged cross-sectional view along line A-A of FIG. 1A.

In FIG. 1A, for convenience of explanation, the actual curved shape is omitted and the windshield 20 is shown in a plane. In the following description, reference numeral $20_1$ is referred to as an upper edge portion of the windshield 20, reference numeral $20_2$ is referred to as a lower edge portion, reference numeral $20_3$ is referred to as a left edge portion, and reference numeral $20_4$ is referred to as a right edge portion. When the windshield 20 is attached to a vehicle of a right-hand drive vehicle, the upper edge refers to the edge on the roof side of the vehicle, the lower edge refers to the edge on the engine room side, the left edge refers to the edge on the front passenger seat side, and the right edge refers to the edge on the driver's seat side.

As shown in FIG. 1, a windshield 20 is laminated glass for a vehicle including a glass plate 21, a glass plate 22, an intermediate film 23, a shielding layer 24, an electrically conductive heating material 30, a first bus bar 31, a second bus bar 32, third bus bars 33, and a fourth bus bar 34.

A glass plate 21 is an in-vehicle side glass plate which becomes the inside of the vehicle when the windshield 20 is attached to the vehicle. Furthermore, a glass plate 22 is an out-vehicle side glass plate that becomes the outside of the vehicle when the windshield 20 is attached to the vehicle.

A glass plate 21 and a glass plate 22 are a pair of glass plates facing each other. An intermediate film 23, an electrically conductive heating material 30, a first bus bar 31, a second bus bar 32, third bus bars 33, and a fourth bus bar 34 are positioned between the pair of glass plates. However, for a third bus bar 33 and a fourth bus bar 34, at least a part of the third bus bar 33 and the fourth bus bar 34 may be positioned between the pair of glass plates. In other words, a third bus bar 33 and a fourth bus bar 34 may have a portion extended from between the pair of glass plates to the outside of the pair of glass plates.

A glass plate 21 and a glass plate 22 are fixed in a state of interposing the intermediate film 23, the electrically conductive heating material 30, the first bus bar 31, the second bus bar 32, the third bus bar 33, and the fourth bus bar 34.

An electrically conductive heating material 30, a first bus bar 31, a second bus bar 32, third bus bars 33, and a fourth bus bar 34 are disposed between the intermediate film 23 and the glass plate 21. The in-vehicle side surfaces of the electrically conductive heating material 30 and the fourth bus bar 34 are in contact with the out-vehicle side surface 21b of the glass plate 21. Furthermore, the in-vehicle side surfaces of the first bus bar 31, the second bus bar 32, and the third bus bar 33 are in contact with the out-vehicle side surface of the fourth bus bar 34. Furthermore, the out-vehicle side surfaces of the electrically conductive heating material 30, the first bus bar 31, the second bus bar 32, and the third bus bar 33 are in contact with the in-vehicle side surface of the intermediate film 23. Furthermore, the intermediate film 23 may be a laminate comprising a plurality of layers.

A shielding layer 24 is an opaque layer and may be provided in a belt-shape along the peripheral edge (the upper edge portion $20_1$, the lower edge portion $20_2$, the left edge portion $20_3$, the right edge portion $20_4$) of the windshield 20. In the example of FIG. 1, a shielding layer 24 is provided on the in-vehicle side surface 21a of the glass plate 21. However, a shielding layer 24, if necessary, may be provided on the in-vehicle side surface 22a of the glass plate 22, or may be provided on both the in-vehicle side surface 21a of the glass plate 21 and the in-vehicle side surface 22a of the glass plate 22.

An opaque shielding layer 24 is provided on the peripheral edge of the windshield 20 so that deterioration by ultraviolet rays such as a resin such as urethane holding the peripheral edge of the windshield 20 on a vehicle body and an adhesive member sticking bracket for locking such as a camera to the windshield 20 can be suppressed. Furthermore, the bus bar can be concealed.

Figure 2:
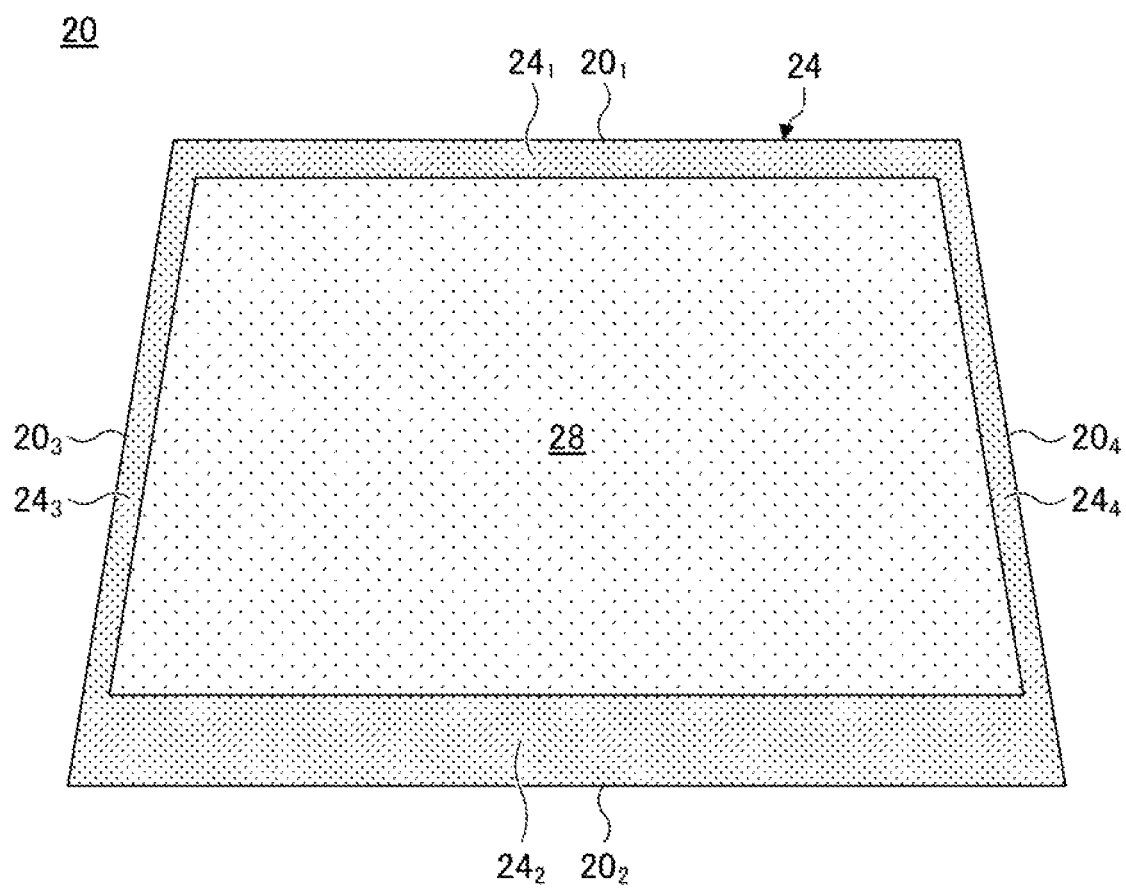
FIG. 2 is a diagram (No. 2) illustrating a windshield for a vehicle according to the first embodiment.

FIG. 2 is a diagram (No. 2) illustrating a windshield for a vehicle according to the first embodiment, and schematically illustrates a state in which the windshield is visually recognized from the inside of a vehicle to the outside of the vehicle. FIG. 2 illustrates an area where the shielding layer 24 is formed.

A shielding layer 24 includes shielding areas $24_1$ and $24_2$ formed along the upper edge portion $20_1$ and the lower edge portion $20_2$ of the windshield 20, and shielding areas $24_3$ and $24_4$ formed along the left edge portion $20_3$ and the right edge portion $20_4$ of the windshield 20. In the shielding layer 24, the widths of the shielding areas $24_3$ and $24_4$ are preferably formed smaller than the widths of the shielding areas $24_1$ and $24_2$ for widening the right and left visibility of the windshield 20.

For a windshield 20, a trapezoidal area surrounded by the shielding areas $24_1$, $24_2$, $24_3$, and $24_4$ is a see-through area 28, and the electrically conductive heating material 30 shown in FIG. 1 is disposed at the see-through area 28. The electrically conductive heating material 30 may be provided on the whole surface of the see-through area 28 or on a part thereof. FIG. 1A illustrates a state of seeing through the shielding layer 24, and only the reference signs of the shielding layer 24, shielding areas $24_1$, $24_2$, $24_3$, and $24_4$ are shown. The same applies to FIG. 3 to FIG. 9 described below.

Returning to FIG. 1, the electrically conductive heating material 30 includes a plurality of linear members. The pattern formed of the plurality of linear members is not especially limited, but may be, for example, a mesh shape shown in FIG. 1A. In FIG. 1A, each linear member may be a wavy line (for example, a sine wave, a triangular wave, a rectangular wave, etc.), or a combination of a wavy line and a straight line.

In the electrically conductive heating material 30, when each linear member is a wavy line, the wavelength and period may not be constant. Furthermore, when each linear member is a wave line, the phases of the adjacent linear members may be aligned or deviated. However, it is preferable that the phases of the adjacent linear members deviate because the light rays caused by regular scattering of light can be suppressed.

A first bus bar 31 and a second bus bar 32 are disposed opposite to each other so as to sandwich the electrically conductive heating material 30 at the see-through area 28 in a plan view and are connected to the electrically conductive heating material 30. The first bus bar 31 is disposed along the upper edge portion $20_2$ of the windshield 20, and the second bus bar 32 is disposed along the lower edge portion $20_2$ of the windshield 20.

A third bus bar 33 connects the first bus bar 31 and the electrode lead 38, and connects the second bus bar 32 and the electrode lead 39. In other words, the electrode lead 38 is electrically connected to the first bus bar 31 via the third bus bar 33, and the electrode lead 39 is electrically connected to the second bus bar 32 via the third bus bar 33. The electrode leads 38 and 39 are a pair of electrode leads positioned at the end of the third bus bar 33 and connected to the positive side and the negative side of the external power supply.

If a voltage is applied between the electrode lead 38 and electrode lead 39, a current flows through the electrically conductive heating material 30 connected between the first bus bar 31 and the second bus bar 32, and the electrically conductive heating material 30 generates heat.

The electrode lead 38 and the electrode lead 39 may be the third bus bar 33 pulled out of the laminated glass as it is. A notch is provided on the in-vehicle side of the glass plate 21, and the third bus bar 33 is fixed to the notch so that a connector required for energization can be connected. In the case of connecting the third bus bar 33 to the connector by providing a notch on the in-vehicle side of the glass plate 21, it is preferable to seal the third bus bar 33 with a resin such as silicone in order to prevent the water from intruding into the connecting part and causing a short-circuiting or corrosion.

The electrode lead 38 and the electrode lead 39 may have a structure in which the third bus bar 33 is connected to a harness for taking out the electrodes inside the laminated glass, and the harness is outside the laminated glass. A flat harness is preferably used as the harness for taking out the electrodes, but the harness is not limited to this, and a wire harness or the like may be used. As a method of connecting the third bus bar 33 and the harness for taking out the electrodes, at least one adhesive member selected from solder or an electrically conductive adhesive material (electrically conductive adhesive layer) may be used. Furthermore, the third bus bar 33 may be brought into direct contact with the harness for taking out the electrodes without using the solder or the conductive adhesive material.

A fourth bus bar 34 is disposed so as to be superposed on the first bus bar 31, the second bus bar 32, and the third bus bar 33. The following effects can be obtained by superposing the fourth bus bar 34 on the first bus bar 31, the second bus bar 32, and the third bus bar 33.

In other words, in an area where the fourth bus bar 34 is superposed, the resistance values of the first bus bar 31, the second bus bar 32, and the third bus bar 33 can be reduced by an amount corresponding to the cross-sectional area of the fourth bus bar 34. Consequently, heat generation loss in the first bus bar 31, the second bus bar 32, and the third bus bar 33 can be suppressed even when currents flowing through the first bus bar 31, the second bus bar 32, and the third bus bar 33 increase in order to increase the heat quantity of the electrically conductive heating material 30. Therefore, the windshield 20 sufficiently exhibits anti-fogging and ice melting performance in the see-through area 28 to be heated originally.

Furthermore, the first bus bar 31, the second bus bar 32, and the third bus bar 33 are preferably disposed so as to be concealed by the shielding areas $24_1$, $24_2$, and $24_3$. In this regard, as the widths of the shielding areas $24_1$, $24_2$, and $24_3$ are reduced in accordance with the improvement of the design property of the windshield 20, the widths of the first bus bar 31, the second bus bar 32, and the third bus bar 33 are forced to be reduced.

If the fourth bus bar 34 is not provided, the resistance values of the first bus bar 31, the second bus bar 32, and the third bus bar 33 are increased as the widths of the first bus bar 31, the second bus bar 32, and the third bus bar 33 are reduced.

However, in the windshield 20, the fourth bus bar 34 is superposed on the first bus bar 31, the second bus bar 32, and the third bus bar 33. Therefore, even if the widths of the first bus bar 31, the second bus bar 32, and the third bus bar 33 are reduced, the resistance values thereof can be reduced.

In the present embodiment, as an example, the fourth bus bar 34 is superposed on all of the first bus bar 31, the second bus bar 32, and the third bus bar 33, but the fourth bus bar 34 may be superposed without being limited to this example. Any one or more of the first bus bar 31, the second bus bar 32, and the third bus bar 33 may be selected, and the fourth bus bar 34 may be superposed on the selected bus bar. Furthermore, the fourth bus bar 34 may be completely overlapped with one or more bus bars selected from among the first bus bar 31, the second bus bar 32, and the third bus bar 33 in a plan view or may be partially overlapped. In other words, the fourth bus bar 34 may be disposed so as to be superposed on at least a part of at least one of the first bus bar 31, the second bus bar 32, and the third bus bar 33.

An example of a preferable superposition of the fourth bus bar 34 is a form in which the fourth bus bar 34 is disposed so as to be superposed on at least the third bus bar 33. The reason why this form is preferable is as follows.

Generally, in the case of a windshield, the widths of the left and right shielding areas $24_3$ and $24_4$ are required to be smaller than the widths of the upper and lower shielding areas $24_1$ and $24_2$ for sufficiently securing the driving field of view. Consequently, when the bus bar is tried to be concealed by the left and right shielding areas $24_3$ and $24_4$, the width of the bus bar is difficult to secure. Then the resistance value of the bus bar is increased, and heat generation loss is likely to occur.

Accordingly, the resistance value of the third bus bar 33 can be reduced and heat generation loss can be suppressed by disposing the fourth bus bar 34 so as to be superposed on the third bus bar 33, which is mostly located in the shielding area 24₃ and has to be narrowed in width.

Next, the materials and the like of each component of the windshield 20 will be described.

[Glass Plates 21, 22]

The glass plates 21 and 22 may be inorganic glass or organic glass. As the inorganic glass, for example, soda-lime glass, borosilicate glass, non-alkali glass, quartz glass, and the like are used without particular limitation. Of these, soda-lime glass is especially preferable. The inorganic glass may be either untempered glass or tempered glass. Untempered glass is made by molding molten glass into a plate shape and slowly cooling it. Tempered glass is formed by forming a compressive stress layer on the surface of untempered glass.

The tempered glass may be either physically tempered glass (for example, wind-cooled tempered glass) or chemically tempered glass. In the case of the physically tempered glass, the glass surface may be tempered by rapidly cooling the glass plate uniformly heated in the bending molding from the temperature near the softening point and generating compressive stress on the glass surface with the temperature difference between the glass surface and the inside of the glass.

In the case of the chemically tempered glass, the glass surface may be strengthened by generating compressive stress on the glass surface with an ion-exchange method or the like after bending molding. Furthermore, glass absorbing ultraviolet rays or infrared rays may be used, and the glass plate is preferably transparent, but it may be colored so as not to impair transparency.

Examples of organic glass include transparent resins such as polycarbonate. The shapes of the glass plates 21 and 22 are not especially limited to a rectangular shape and may be a shape processed into various shapes and curvatures. Gravity molding, press molding, or the like is used as the bending molding of the glass plates 21 and 22. The molding method of the glass plates 21 and 22 is not especially limited, but for example, in the case of inorganic glass, a glass plate molded by a float method or the like is preferable.

The plate thickness of the glass plates 21 and 22 is preferably 0.4 mm or more and 3.0 mm or less, more preferably 1.0 mm or more and 2.5 mm or less, further preferably 1.5 mm or more and 2.3 mm or less, and especially preferably 1.7 mm or more and 2.0 mm or less. The glass plates 21 and 22 may have the same plate thickness or different plate thicknesses. When the plate thicknesses of the glass plates 21 and 22 are different from each other, it is preferable that the plate thickness of the glass plate positioned inside the vehicle is thinner. When the thickness of the glass plate positioned inside the vehicle is thinner, the windshield 20 can be sufficiently reduced in weight if the thickness of the glass plate positioned inside the vehicle is 0.4 mm or more and 1.3 mm or less.

[Intermediate Film 23]

As an intermediate film 23, many thermoplastic resins are used, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymerized resin, an ethylene-ethyl acrylate copolymerized resin, etc., which have been used for such applications since the past. Furthermore, a resin composition that includes a modified block copolymer hydride disclosed in JP-A-2015-821 may also be preferably used. The intermediate film 23 is preferably a plasticized polyvinyl acetal-based resin, and more preferably a polyvinyl butyral.

The film thickness of the intermediate film 23 is preferably 0.3 mm or more at the thinnest portion as the total film thickness in the configuration shown in FIG. 1B. When the film thickness of the intermediate film 23 is 0.3 mm or more, the penetration resistance required for the windshield is sufficient. The film thickness of the intermediate film 23 is preferably 2.28 mm or less at the thickest portion. When the maximum film thickness of the intermediate film 23 is 2.28 mm or less, the mass of the laminated glass is not increased excessively. The film thickness of the intermediate film 23 is preferably 0.3 mm or more and 1 mm or less. Furthermore, the intermediate film 23 may not have a uniform thickness and may have a wedge shape in a cross-sectional view.

The intermediate film 23 may include a sound-insulating function. For example, an intermediate film 23 may be a sound insulation film which can improve the sound insulation of the laminated glass by forming the intermediate film consisting of three or more layers and making the shore hardness of the inner layer lower than the shore hardness of the outer layer by adjusting the plasticizer or the like. In this case, the shore hardness of the outer layer may be the same or different.

For manufacturing the intermediate film 23, for example, resin materials used for the intermediate film are selected among the resin materials described above, as appropriate. Then, the selected resin materials are extruded and molded at a hot-melt state by using an extruder. An extruded condition, such as an extruding speed of the extruder, is set to be constant. Next, the extruded resin film may be extended, for example, as needed so as to fit the design of the windshield 20. In such a way, the upper and lower edges of the intermediate film have curvatures.

[Shielding Layer 24]

Examples of a shielding layer 24 include a layer formed by applying black ceramic printing ink on a glass plate with screen printing or the like as well as baking the ink. In the shielding layer 24, the width of the shielding area (any one of the shielding areas 24₁ to 24₄) is preferably larger than the width of the first bus bar 31, the second bus bar 32, or a third bus bar 33 disposed in the shielding area.

If the shielding layer 24 is provided on the in-vehicle side surface 21a of the glass plate 21, the first bus bar 31, the second bus bar 32, the third bus bar 33, and the fourth bus bar 34 can be concealed by the shielding layer 24 when the windshield 20 is viewed from the inside of the vehicle, and it is preferable because the design property of the appearance is not impaired.

Furthermore, if the shielding layer 24 is provided on the in-vehicle side surface 22a of the glass plate 22, the first bus bar 31, the second bus bar 32, the third bus bar 33, and the fourth bus bar 34 can be concealed by the shielding layer 24 when the windshield 20 is viewed from the outside of the vehicle, and it is preferable because the design property of the appearance is not impaired.

Furthermore, the shielding layer 24 may be provided on both the in-vehicle side surface 21a of the glass plate 21 and the in-vehicle side surface 22a of the glass plate 22. In this case, the first bus bar 31, the second bus bar 32, the third bus bar 33, and the fourth bus bar 34 can be concealed by the shielding layer 24 when the windshield 20 is viewed from the inside and outside of the vehicle, and it is preferable because the design property of the appearance is not impaired.

[Electrically Conductive Heating Material 30, First Bus Bar 31, Second Bus Bar 32, and Third Bus Bar 33]

The electrically conductive heating material 30, the first bus bar 31, the second bus bar 32, and the third bus bar 33 are integrally formed of the same material. The material of the electrically conductive heating material 30, the first bus bar 31, the second bus bar 32, and the third bus bar 33 is not especially limited as long as it is an electrically conductive material such as a metal material. Examples of metal materials include gold, silver, copper, aluminum, tungsten, platinum, palladium, nickel, cobalt, titanium, iridium, zinc, magnesium, tin, and the like. Furthermore, these metals may be plated or may be a composite with an alloy or a resin.

A method of forming the electrically conductive heating material 30, the first bus bar 31, the second bus bar 32, and the third bus bar 33 may be an etching method such as photolithography, or a printing method such as screen printing, inkjet printing, offset printing, flexographic printing, or gravure printing. In any method, the electrically conductive heating material 30, the first bus bar 31, the second bus bar 32, and the third bus bar 33 may be integrally formed of the same material. In this case, the electrically conductive heating material 30, the first bus bar 31, the second bus bar 32, and the third bus bar 33 may have the same thickness or different thicknesses from each other.

Furthermore, the electrically conductive heating material 30, the first bus bar 31, the second bus bar 32, and the third bus bar 33 may be an electrically conductive thin film such as silver or tin-doped indium oxide formed by a sputtering method. As a method of forming a thin film, a PVD (physical vapor deposition) method such as vacuum vapor deposition or ion plating, or a CVD (chemical vapor deposition) method may also be preferably used. Otherwise, the electrically conductive thin film may be formed by using a wet coating method.

In the electrically conductive heating material 30, the line width of each linear member is preferably 25 µm or less, more preferably 20 µm or less, and further preferably 16 µm or less. As the line width of the linear member of the electrically conductive heating material 30 is narrower, it becomes harder for a driver to visually recognize the linear member, and it can be prevented that the presence of the linear member is an obstacle for driving.

In the electrically conductive heating material 30, the thickness of each linear member is preferably 20 µm or less, more preferably 12 µm or less, and further preferably 8 µm or less. As the thickness of the linear member of the electrically conductive heating material 30 is thinner, the area where the linear member reflects light is reduced, and the sunlight and the light such as a headlamp of an opposing car are less likely to be reflected so that the reflected light can be prevented from being an obstacle to the driver for driving.

Generally, the manufacturing process can be simplified and the productivity is further improved by integrally forming the electrically conductive heating material 30, the first bus bar 31, the second bus bar 32, and the third bus bar 33 with the same material. However, as the thickness of the electrically conductive heating material 30 becomes thinner, the thickness of the first bus bar 31, the second bus bar 32, and the third bus bar 33 also become thinner. In other words, as the thickness of the linear member of the electrically conductive heating material 30 is made thinner, the area reflecting the light is reduced, and it is desirable for the driver to operate. However, at the same time, the thickness of the first bus bar 31, the second bus bar 32, and the third bus bar 33 is made thinner. Therefore, the resistance values of the first bus bar 31, the second bus bar 32, and the third bus bar 33 are increased, and heat generation in the essential electrically conductive heating material 30 cannot be sufficiently secured due to heat generation loss. In consideration of the above, the present disclosure is especially useful when the electrically conductive heating material 30, the first bus bar 31, the second bus bar 32, and the third bus bar 33 are integrally formed of the same material, and both visibility of the driver and heating characteristics of the heating glass can be improved.

[Fourth Bus Bar 34]

A fourth bus bar 34 may be formed of a material including any one of gold, silver, copper, aluminum, and tin. A copper ribbon or flat braided copper wire may be preferably used for the fourth bus bar 34. The copper ribbon or flat braided wire may be plated with a metal other than copper. Furthermore, the fourth bus bar 34 may be made of the same material as the electrically conductive heating material 30, the first bus bar 31, the second bus bar 32, and the third bus bar 33, or may be made of different materials.

At least one adhesive member selected from solder or a conductive adhesive material (conductive adhesive layer) may be used for joining the fourth bus bar 34 to the first bus bar 31, the second bus bar 32, and the third bus bar 33. Furthermore, the fourth bus bar 34 may be brought into direct contact with the first bus bar 31, the second bus bar 32, and the third bus bar 33 without using the solder or the conductive adhesive material.

The fourth bus bar 34 may be formed with a method such as a screen printing, inkjet printing, offset printing, flexographic printing, or gravure printing. The fourth bus bar 34 may be formed between the glass plate and the first bus bar 31, the second bus bar 32, or the third bus bar 33, and may be formed between the intermediate film 23 and the first bus bar 31, the second bus bar 32, or the third bus bar 33. The thickness of the fourth bus bar 34 is preferably 50 µm or more, more preferably 75 µm or more, and further preferably 100 µm or more.

[Method of Manufacturing a Windshield 20]

A general manufacturing method can be cited as a manufacturing method of a windshield 20, and one example is shown below.

First, the fourth bus bar 34 is formed on the out-vehicle side surface 21b of the glass plate 21. Next, the electrically conductive heating material 30, the first bus bar 31, the second bus bar 32, and the third bus bar 33 are formed on the in-vehicle side surface of the intermediate film 23. The electrically conductive heating material 30, the first bus bar 31, the second bus bar 32, and the third bus bar 33 may be integrally formed of the same material. For example, a method of forming the electrically conductive heating material 30, the first bus bar 31, the second bus bar 32, and the third bus bar 33 on the in-vehicle side surface of the intermediate film 23 may be direct forming on the intermediate film 23. Alternatively, for example, the intermediate film consists of two or more layers, and one intermediate film layer having the electrically conductive heating material 30, the first bus bar 31, the second bus bar 32, and the third bus bar 33 formed on the surface is laminated on another intermediate film layer to form the intermediate film 23. A detailed description of the latter will be described below.

Next, an intermediate film 23 is laminated on the glass plate 21 so that the out-vehicle side surface of the fourth bus bar 34 formed on the glass plate 21 is brought into contact with the in-vehicle side surfaces of the first bus bar 31, the second bus bar 32, and the third bus bar 33 formed on the intermediate film 23 to manufacture the first laminate. Then, the glass plate 22 is further laminated on the intermediate film 23 of the first laminate to manufacture the second laminate.

Subsequently, for example, the second laminate is placed within a rubber bag and then bonded in a vacuum at a pressure of −65 to −100 kPa and temperatures of approximately 70 to 110° C. Furthermore, for example, in a case where the press bonding process for heating and pressurizing the laminate is carried out under conditions of 100 to 150° C. and a pressure of 0.6 to 1.3 MPa, the resulting laminated glass can have excellent durability. However, in some cases, the heating and pressurizing process described above may not be used in consideration of simplifying manufacturing processes as well as properties of materials required for the laminated glass. By heating and pressurizing in a vacuum, the intermediate film 23 is deformed, and the in-vehicle side surface of the electrically conductive heating material 30 formed on the intermediate film 23 is brought into contact with the out-vehicle side surface 21b of the glass plate 21.

In the above description regarding the manufacture of laminated glass having the cross-sectional structure shown in FIG. 1B, the fourth bus bar 34 is formed on the out-vehicle side surface 21b of the glass plate 21, but this is merely an example. For example, an electrically conductive heating material 30, a first bus bar 31, a second bus bar 32, and a third bus bar 33 may be formed on the in-vehicle side surface of the intermediate film 23, and a fourth bus bar 34 may be formed on the in-vehicle side surfaces of the first bus bar 31, the second bus bar 32, and the third bus bar 33.

As described above, in the windshield 20, a fourth bus bar 34 is disposed so as to be superposed on one or more bus bars of the first bus bar 31, the second bus bar 32, and the third bus bar 33. Accordingly, resistance values of the first bus bar 31, the second bus bar 32, and the third bus bar 33 can be reduced in an area where the fourth bus bar 34 is disposed so as to be superposed. Consequently, heat generation loss in the first bus bar 31, the second bus bar 32, and the third bus bar 33 can be suppressed even when currents flowing through the first bus bar 31, the second bus bar 32, and the third bus bar 33 increase in order to increase the heat quantity of the electrically conductive heating material 30. Therefore, the windshield 20 sufficiently exhibits anti-fogging and ice melting performance in the see-through area 28 that originally needs to be heated.

Furthermore, in the windshield 20, the temperature at which heat is generated in the first bus bar 31, the second bus bar 32, and the third bus bar 33 can be lowered by disposing the fourth bus bar 34 in a superposed manner. Therefore, the concern that the glass plates 21 and 22 may be broken due to the thermal stress due to the heat generated in the first bus bar 31, the second bus bar 32, and the third bus bar 33 can be eliminated.

Modification 1 of the First Embodiment

Modification 1 of the first embodiment shows an example in which the heating zone of the electrically conductive heating material 30 is divided into two or more. For the same elements of Modification 1 as those of the first embodiment, explanations may be omitted.

Figure 3:
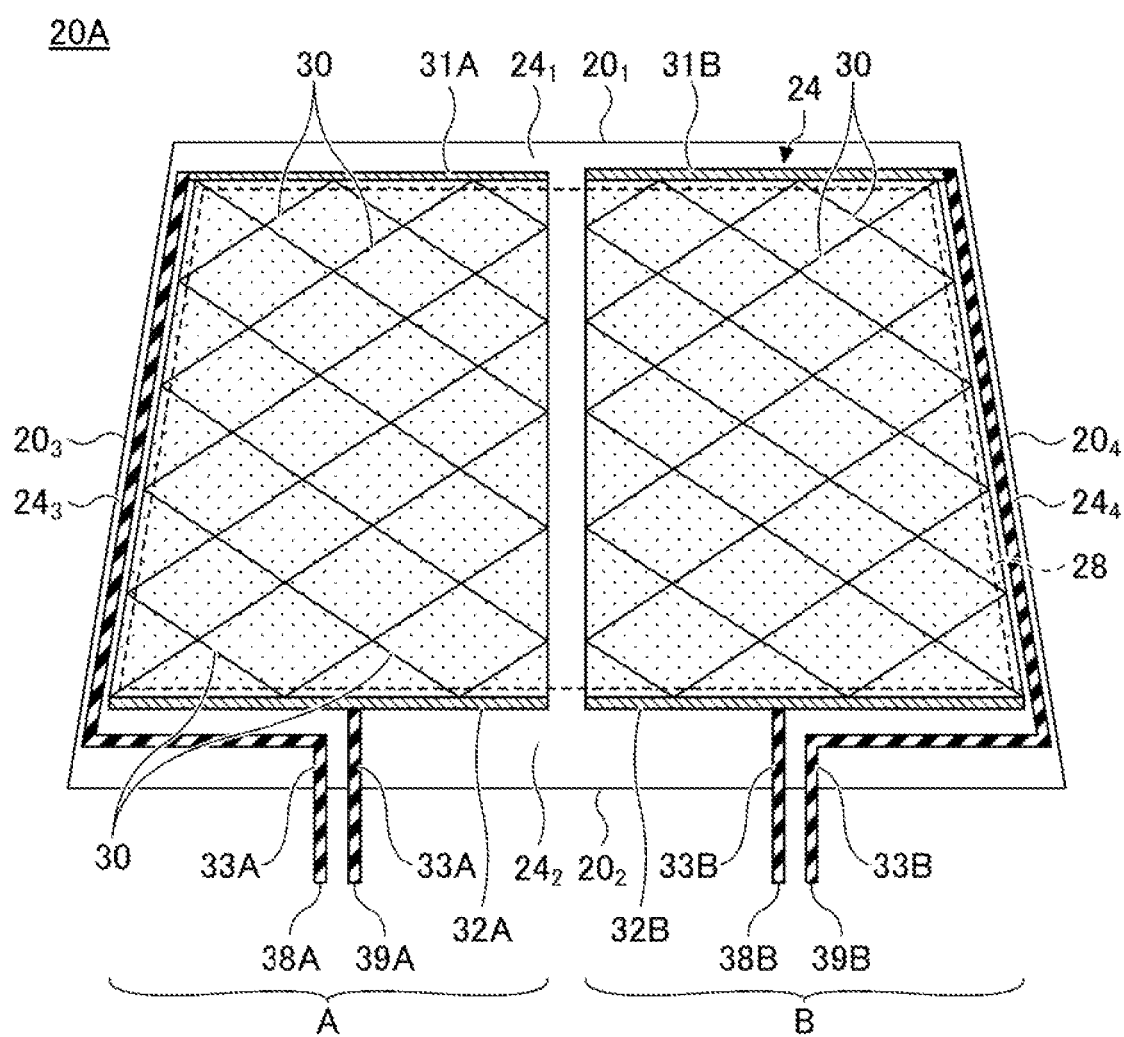
FIG. 3 is a diagram illustrating a windshield for a vehicle according to Modification 1 of the first embodiment.

FIG. 3 is a diagram illustrating a windshield for a vehicle according to Modification 1 of the first embodiment, and schematically illustrates a state in which the windshield is visually recognized from the inside of a vehicle to the outside of the vehicle.

As shown in FIG. 3, the see-through area 28 of the windshield 20A includes a heating zone A and a heating zone B divided into left and right. Here, the heating zone is an area that is heated by energizing between a set of bus bars.

A first bus bar 31A and a second bus bar 32A compose a set of bus bars that are disposed opposite to each other across the electrically conductive heating material 30 at the see-through area 28 in the heating zone A and are connected to the electrically conductive heating material 30 at the see-through area 28 in the heating zone A. A first bus bar 31A is disposed along the upper edge portion $20_1$ of the windshield 20A, and a second bus bar 32A is disposed along the lower edge portion $20_2$ of the windshield 20A.

A third bus bar 33A connects the first bus bar 31A and the electrode lead 38A and connects the second bus bar 32A and the electrode lead 39A. In other words, the electrode lead 38A is electrically connected to the first bus bar 31A via the third bus bar 33A, and the electrode lead 39A is electrically connected to the second bus bar 32A via the third bus bar 33A. The electrode leads 38A and 39A are a pair of electrode leads positioned at the end of the third bus bar 33A and connected to the positive and negative sides of the external power supply.

If a voltage is applied between the electrode lead 38A and the electrode lead 39A, a current flows through the electrically conductive heating material 30 connected between the first bus bar 31A and the second bus bar 32A, and the electrically conductive heating material 30 disposed in the heating zone A generates heat.

A first bus bar 31B and a second bus bar 32B compose a set of bus bars that are disposed opposite to each other across the electrically conductive heating material 30 at the see-through area 28 in the heating zone B and are connected to the electrically conductive heating material 30 at the see-through area 28 in the heating zone B. A first bus bar 31B is disposed along the upper edge portion $20_1$ of the windshield 20A, and a second bus bar 32B is disposed along the lower edge portion $20_2$ of the windshield 20A.

A third bus bar 33B connects the first bus bar 31B and the electrode lead 39B and connects the second bus bar 32B and the electrode lead 38B. In other words, the electrode lead 39B is electrically connected to the first bus bar 31B via the third bus bar 33B, and the electrode lead 38B is electrically connected to the second bus bar 32B via the third bus bar 33B. The electrode leads 38B and 39B are a pair of electrode leads positioned at the end of the third bus bar 33B and connected to the positive and negative sides of the external power supply.

If a voltage is applied between the electrode lead 38B and the electrode lead 39B, a current flows through the electrically conductive heating material 30 connected between the first bus bar 31B and the second bus bar 32B, and the electrically conductive heating material 30 disposed in the heating zone B generates heat.

The electrically conductive heating material 30 disposed in the heating zone A and the electrically conductive heating material 30 disposed in the heating zone B are not connected, and temperature control may be performed independently. Furthermore, the windshield 20A may include three or more heating zones capable of independent temperature control.

A fourth bus bar 34 is disposed so as to be superposed on the first bus bars 31A and 31B, the second bus bars 32A and 32B, and the third bus bars 33A and 33B. By disposing the fourth bus bar 34 on the first bus bars 31A and 31B, the second bus bars 32A and 32B, and the third bus bars 33A and 33B in a superposed manner, a similar effect as that of the first embodiment can be obtained.

Furthermore, the fourth bus bar 34 may be disposed so as to be superposed on an area of at least a part of at least one of the first bus bars 31A and 31B, the second bus bars 32A and 32B, and the third bus bars 33A and 33B.

Modification 2 of the First Embodiment

Modification 2 of the first embodiment shows an example in which the feeding direction to the electrically conductive heating material is different from that of the first embodiment. For the same elements of Modification 2 as those of the first embodiment, explanations may be omitted.

Figure 4:
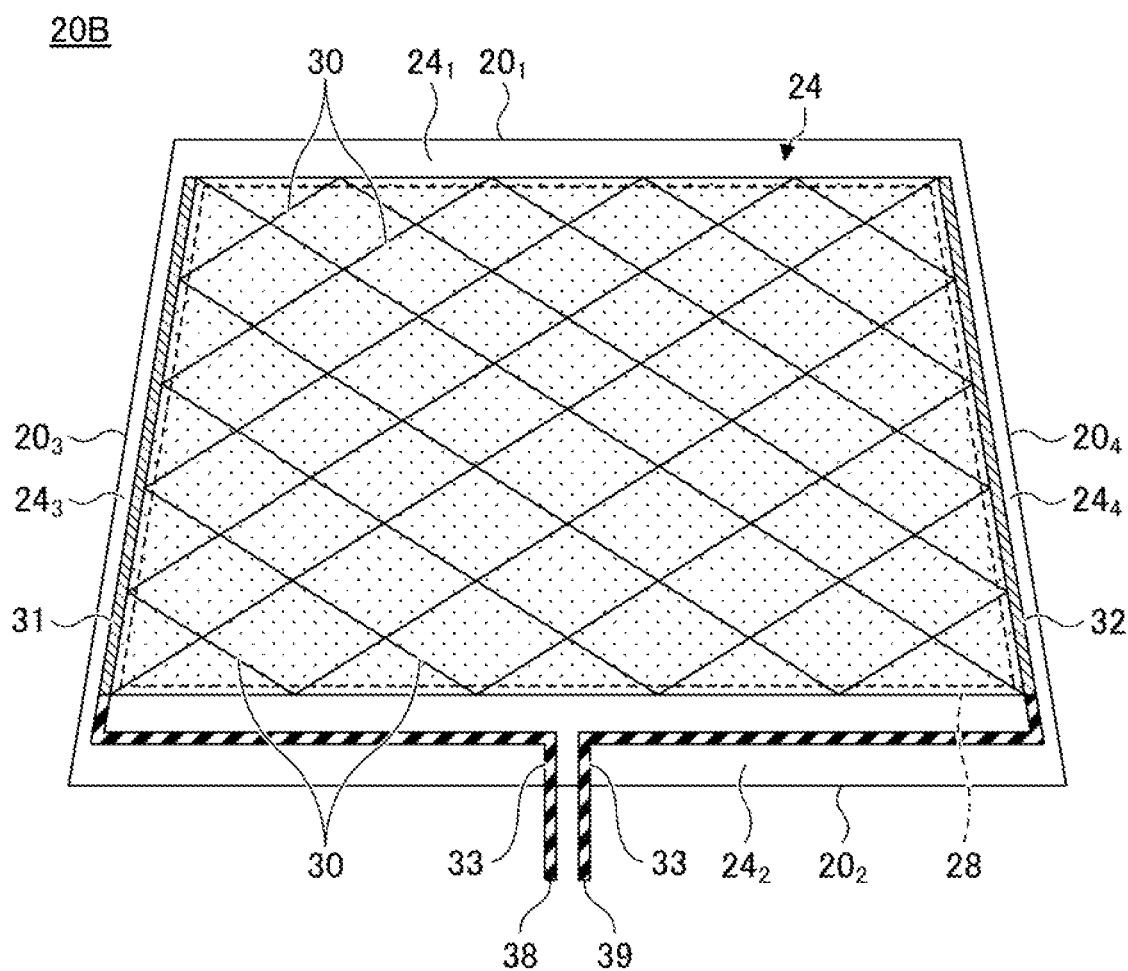
FIG. 4 is a diagram illustrating a windshield for a vehicle according to Modification 2 of the first embodiment.

FIG. 4 is a diagram illustrating a windshield for a vehicle according to Modification 2 of the first embodiment, and schematically illustrates a state in which the windshield is visually recognized from the inside of a vehicle to the outside of the vehicle.

As shown in FIG. 4, in the windshield 20B, the first bus bar 31 is disposed along the left edge portion $20_3$, and the second bus bar 32 is disposed along the right edge portion $20_4$. That is, the windshield 20B differs from the windshield 20 in that the power feeding direction is the horizontal direction, while the power feeding direction of the windshield 20 is the vertical direction (see FIGS. 1A and 1B). As described above, the power feeding direction may be the horizontal direction or the vertical direction of the windshield.

In the windshield 20B, the fourth bus bar 34 may be disposed so as to be superposed on all of the first bus bar 31, the second bus bar 32, and the third bus bar 33, but the superposing form of the fourth bus bar 34 is not limited to this. The fourth bus bar 34 may be disposed so as to be superposed on an area of at least a part of at least one of the first bus bar 31, the second bus bar 32, and the third bus bar 33.

An example of a preferable superposition of the fourth bus bar 34 is a form in which the fourth bus bar 34 is disposed so as to be superposed only on the first bus bar 31 and the second bus bar 32. The reason why this form is preferable is as follows.

As was previously described, generally, in the case of a windshield, the widths of the left and right shielding areas $24_3$ and $24_4$ are required to be smaller than the widths of the upper and lower shielding areas $24_2$ and $24_2$ for sufficiently securing the driving field of view. Consequently, when the bus bar is tried to be concealed by the left and right shielding areas $24_3$ and $24_4$, the width of the bus bar is difficult to secure. Then the resistance value of the bus bar is increased, and heat generation loss is likely to occur. Furthermore, since the windshield is generally longer in the horizontal direction than in the vertical direction, the electrically conductive heating material and the bus bar are required to have lower resistance when power is fed in the horizontal direction.

Therefore, considering such characteristics of the windshield, in the windshield 20B in which the power is fed in the horizontal direction, it is preferable that the fourth bus bar 34 is disposed so as to be superposed on at least the first bus bar 31 and the second bus bar 32. This allows the resistance values of the first bus bar 31 and the second bus bar 32 to be reduced, and the heat generation loss can be suppressed.

Modification 3 of the First Embodiment

Modification 3 of the first embodiment shows an example in which the disposition of the linear members of the electrically conductive heating material is different from that of the first embodiment. For the same elements of Modification 2 as those of the first embodiment, explanations may be omitted.

Figure 5:
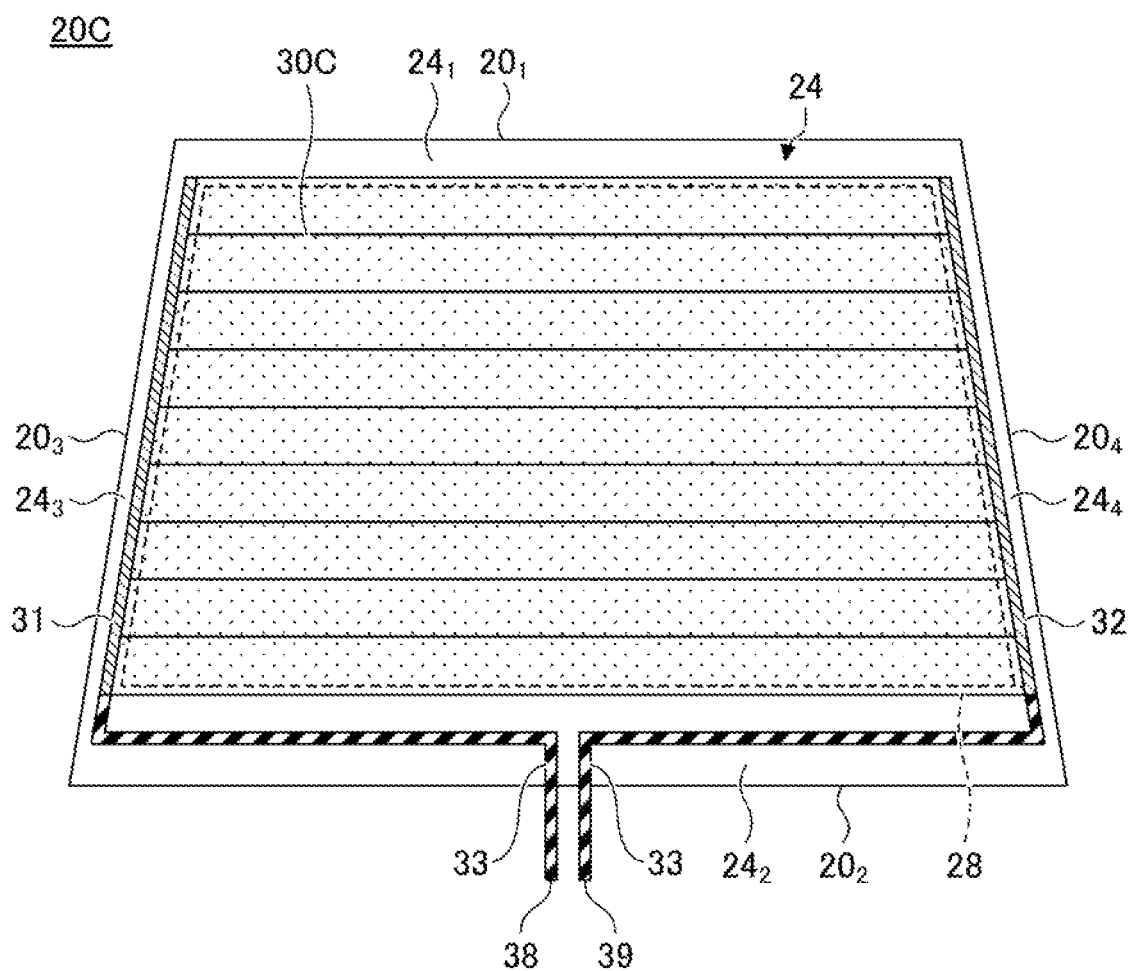
FIG. 5 is a diagram illustrating a windshield for a vehicle according to Modification 3 of the first embodiment.

FIG. 5 is a diagram illustrating a windshield for a vehicle according to Modification 3 of the first embodiment, and schematically illustrates a state in which the windshield is visually recognized from the inside of a vehicle to the outside of the vehicle.

As shown in FIG. 5, the windshield 20C differs from the windshield 20B (see FIG. 4) in that the electrically conductive heating material 30 is replaced with the electrically conductive heating material 30C. The electrically conductive heating material 30C includes a plurality of linear members disposed in a direction along the upper edge portion $20_1$ and the lower edge portion $20_2$. The line width and thickness of each linear member of the electrically conductive heating material 30C may be the same as in the case of the electrically conductive heating material 30.

In FIG. 5, each linear member may be a wavy line (for example, a sine wave, a triangular wave, a rectangular wave, etc.) or a combination of a wavy line and a straight line.

In the electrically conductive heating material 30C, when each linear member is a wavy line, the wavelength and period may not be constant. Furthermore, when each linear member is a wave line, the phases of the adjacent linear members may be aligned or deviated. However, it is preferable that the phases of the adjacent linear members deviate because the light rays caused by regular scattering of light can be suppressed.

In such a manner, the linear member of the electrically conductive heating material may be in the mesh shape shown in FIG. 1 or in the horizontal linear shape shown in FIG. 5.

Second Embodiment

The second embodiment shows an example in which an electrically conductive heating material is disposed in a windshield including an information transmitting/receiving area. In the second embodiment, the explanation of the same elements as the embodiment previously described may be omitted.

Figure 6:
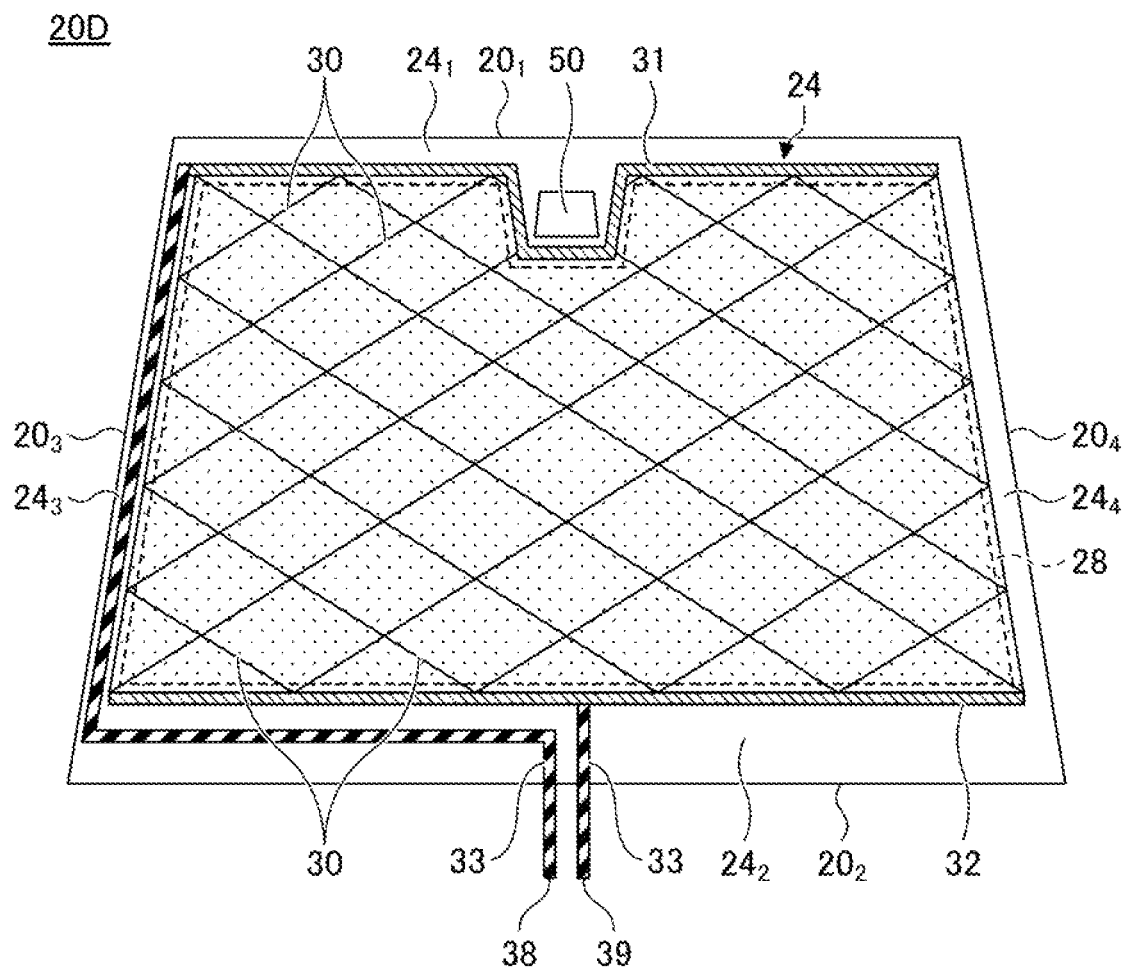
FIG. 6 is a diagram (No. 1) illustrating a windshield for a vehicle according to a second embodiment.

FIG. 6 is a diagram (No. 1) illustrating a windshield for a vehicle according to the second embodiment, and schematically illustrates a state in which the windshield is visually recognized from the inside of a vehicle to the outside of the vehicle.

As shown in FIG. 6, an information transmitting/receiving area 50 is defined on the windshield 20D. An information transmitting/receiving area 50 functions as an area where the device transmits and/or receives information when a device (camera, various sensors, etc.) transmitting and/or receiving information is disposed near an upper edge part $20_1$ of the windshield 20D in a vehicle. The shape of the information transmitting/receiving area 50 is not especially limited to a planar shape, and, for example, a trapezoid shape may be applied.

If an electrically conductive heating material or a bus bar exists in the information transmitting/receiving area 50, the device may be prevented from transmitting and/or receiving information. In consideration of the above, it is preferable that an electrically conductive heating material and a bus bar are not disposed in the information transmitting/receiving area 50.

For example, as shown in FIG. 6, the electrically conductive heating material 30 is not disposed in the information transmitting/receiving area 50, and the first bus bar 31 may be disposed so as to bypass the outer edges of left and right edges and the lower edge of the information transmitting/receiving area 50.

Figure 7:
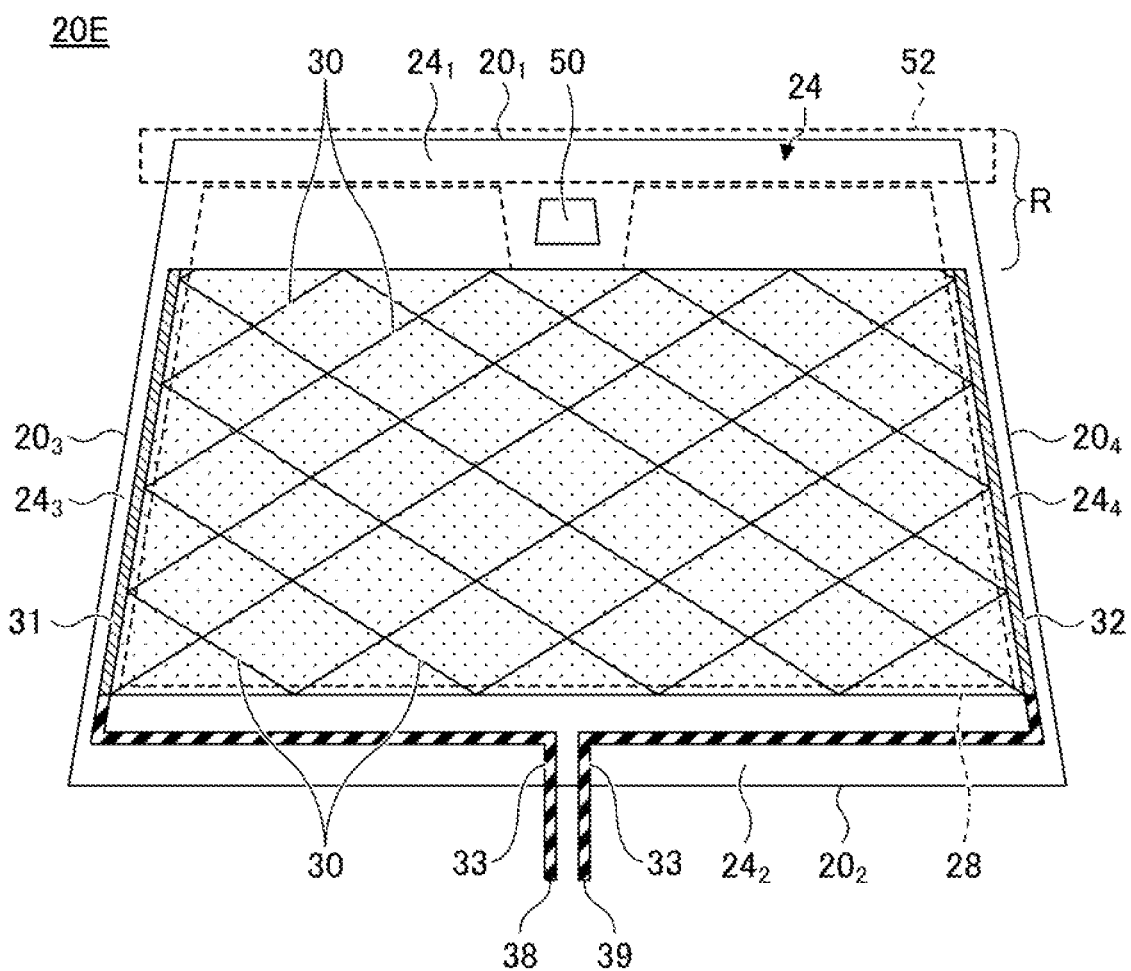
FIG. 7 is a diagram (No. 2) illustrating a windshield for a vehicle according to a second embodiment.

FIG. 6 illustrates an example when the power feeding direction is the vertical direction, while FIG. 7 illustrates an example when the power feeding direction is the horizontal direction. In FIG. 7, Region R without an electrically conductive heating material 30, a first bus bar 31, and a second bus bar 32 is provided on the upper edge portion $20_1$ of the windshield 20E, and an information transmitting/receiving area 50 is defined in Region R. In this case, such as an antenna disposition area 52 in a rectangular shape in a plan view may be defined in Region R.

Figure 8:
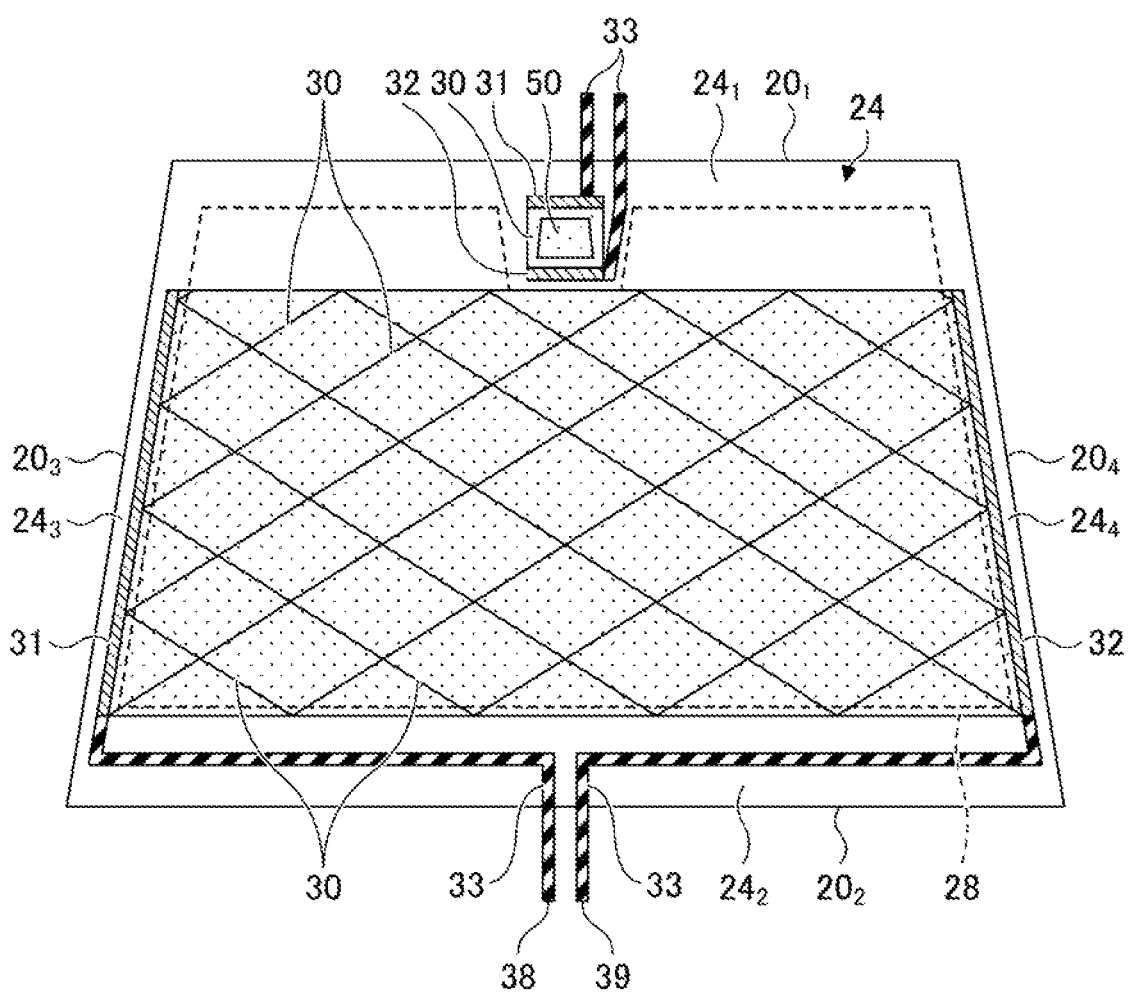
FIG. 8 is a diagram (No. 3) illustrating a windshield for a vehicle according to a second embodiment.
Figure 9:
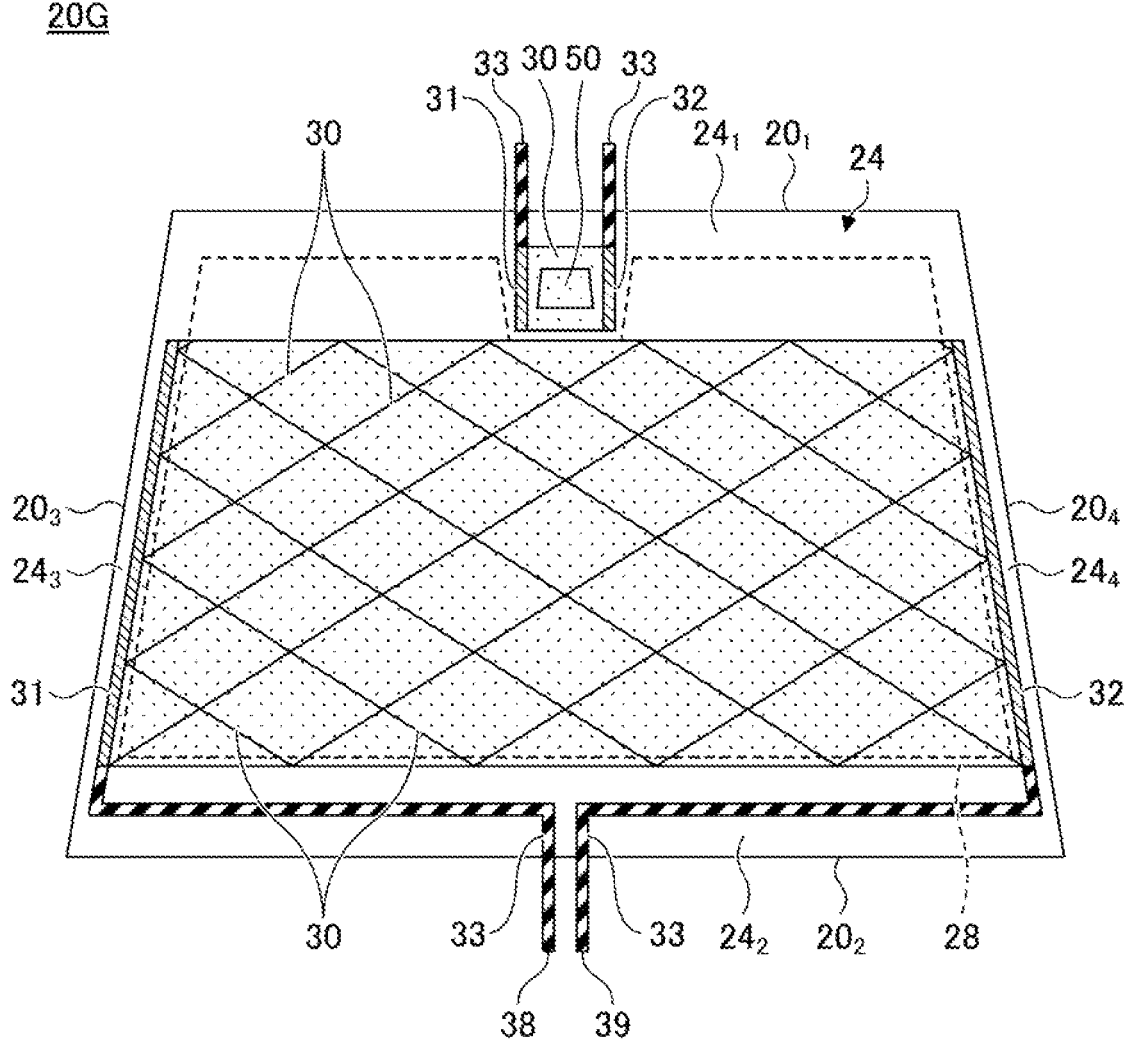
FIG. 9 is a diagram (No. 4) illustrating a windshield for a vehicle according to a second embodiment.

However, when the electrically conductive heating material 30 is designed so as not to affect the device (camera, various sensors, etc.) (for example, when the line width of the electrically conductive heating material 30 is narrower and the film thickness is thinner, etc.), the electrically conductive heating material 30 may be disposed in the information transmitting/receiving area 50 as shown in FIG. 8 and FIG. 9. For example, the electrically conductive heating material 30 may be a mesh shape, a linear shape, or a sine wave shape.

In a windshield 20F shown in FIG. 8 and a windshield 20G shown in FIG. 9, the electrically conductive heating material 30 also exists in the information transmitting/receiving area 50, and power can be fed through the first bus bar 31, the second bus bar 32, and the third bus bar 33. FIG. 8 illustrates an example in which the power is fed to the electrically conductive heating material 30 in the information transmitting/receiving area 50 in the vertical direction, and FIG. 9 illustrates an example in which the power is fed in the horizontal direction. In FIG. 8 and FIG. 9, the inside of the see-through area 28 and the inside of the information transmitting/receiving area 50 may be heated independently.

By designing the electrically conductive heating material 30 so as not to affect the device (camera, various sensors, etc.), the electrically conductive heating material 30 can also be disposed in the information transmitting/receiving area 50. By heating the electrically conductive heating material 30 in the information transmitting/receiving area 50, the information transmitting/receiving area 50 is available of anti-fogging and ice melting performance.

Furthermore, a fourth bus bar 34 may be disposed so as to be superposed on a part or all of the first bus bar 31, the second bus bar 32, and the third bus bar 33 for feeding power to the electrically conductive heating material 30 in the information transmitting/receiving area 50. This allows the resistance value of the bus bar disposed so as to be superposed the fourth bus bar to be reduced, and heat generation loss can be suppressed.

Figure 10:
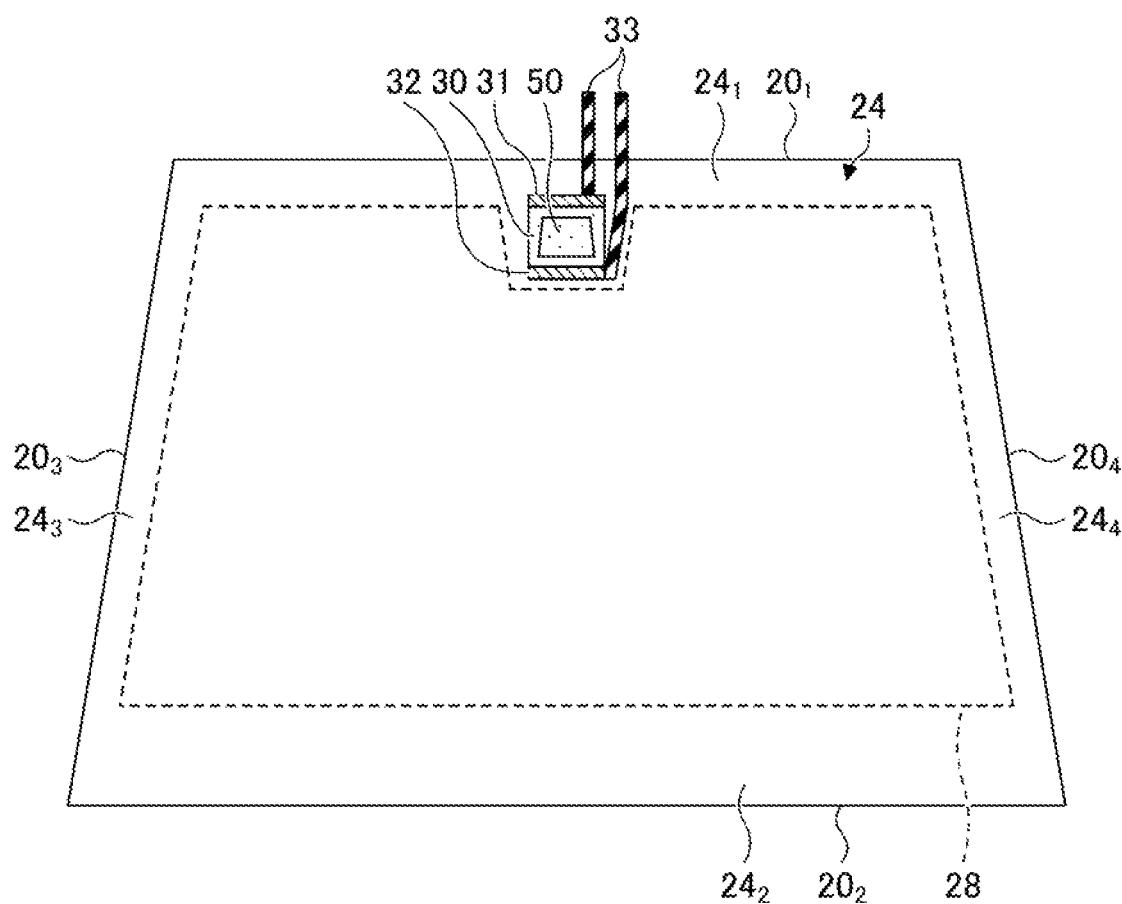
FIG. 10 is a diagram (No. 5) illustrating a windshield for a vehicle according to a second embodiment.
Figure 11:
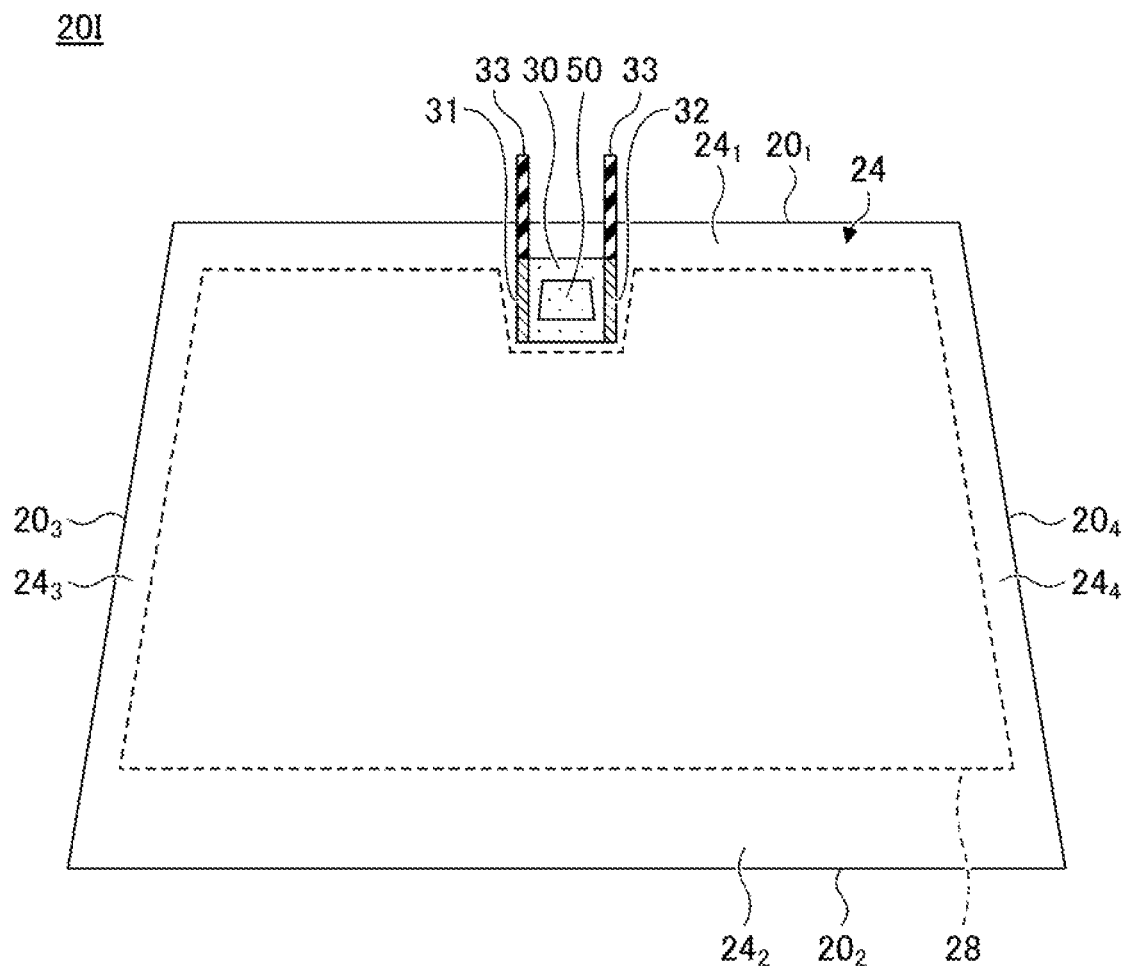
FIG. 11 is a diagram (No. 6) illustrating a windshield for a vehicle according to a second embodiment.

As a windshield 20H shown in FIG. 10 or a windshield 20I shown in FIG. 11, the electrically conductive heating material 30 may be disposed only in the information transmitting/receiving area 50, and the power may be fed through the first bus bar 31, the second bus bar 32, and the third bus bar 33. In FIG. 10 and FIG. 11, the electrically conductive heating material 30 is not disposed at the see-through area 28.

Modification of Cross-Sectional Structure

A cross-sectional structure in the vicinity of the fourth bus bar 34 is shown in FIG. 1B, but the cross-sectional structure in the vicinity of the fourth bus bar 34 is not limited to FIG. 1B and may be modified as shown in FIG. 12A to FIG. 12D in each embodiment. In FIG. 12A~FIG. 12D, the explanation of the same elements as the embodiment previously described may be omitted.

FIGS. 12A-12D are cross-sectional views illustrating a cross-sectional structure in the vicinity of the fourth bus bar and illustrates a cross-sectional view corresponding to FIG. 1B.

Figure 12A:
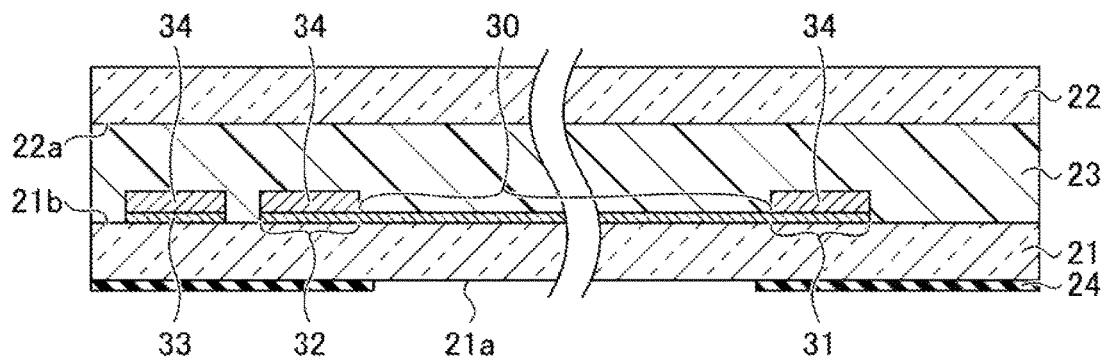
FIGS. 12A, 12B, 12C, and 12D are cross-sectional views illustrating a cross-sectional structure in the vicinity of the fourth bus bar.

In FIG. 12A, the in-vehicle side surfaces of the electrically conductive heating material 30, the first bus bar 31, the second bus bar 32, and the third bus bar 33 are in contact with the out-vehicle side surface 21b of the glass plate 21. Furthermore, the fourth bus bar 34 is positioned between the first bus bar 31, the second bus bar 32, and the third bus bar 33 and the intermediate film 23, and the in-vehicle side surface of the fourth bus bar 34 is in contact with the out-vehicle side surfaces of the first bus bar 31, the second bus bar 32, and the third bus bar 33. Furthermore, the out-vehicle side surface of the electrically conductive heating material 30 and the out-vehicle side surface of the fourth bus bar 34 are in contact with the in-vehicle side surface of the intermediate film 23.

In order to manufacture laminated glass having a cross-sectional structure shown in FIG. 12A, first, a fourth bus bar 34 is formed on the in-vehicle side surface of the intermediate film 23.

Next, an electrically conductive heating material 30, a first bus bar 31, a second bus bar 32, and a third bus bar 33 are formed on the intermediate film 23. At this time, the electrically conductive heating material 30 is formed on the in-vehicle side surface of the intermediate film 23, and the first bus bar 31, the second bus bar 32, and the third bus bar 33 are formed on the in-vehicle side surface of the fourth bus bar 34. The electrically conductive heating material 30, the first bus bar 31, the second bus bar 32, and the third bus bar 33 may be integrally formed of the same material.

Next, an intermediate film 23 is laminated on the glass plate 21 so that the surface 21b on the out-vehicle side surface 21b of the glass plate 21 and the in-vehicle side surfaces of the first bus bar 31, the second bus bar 32, and the third bus bar 33 formed on the intermediate film 23 come into contact with each other to manufacture a first laminate. Then, a glass plate 22 is further laminated on the intermediate film 23 of the first laminate to manufacture a second laminate. Next, by heating and pressurizing the second laminate in a vacuum, the laminated glass having the cross-sectional structure shown in FIG. 12A can be manufactured. By heating and pressurizing in a vacuum, the intermediate film 23 is deformed, and the in-vehicle side surface of the electrically conductive heating material 30 formed on the intermediate film 23 is brought into contact with the out-vehicle side surface 21b of the glass plate 21.

Figure 12B:
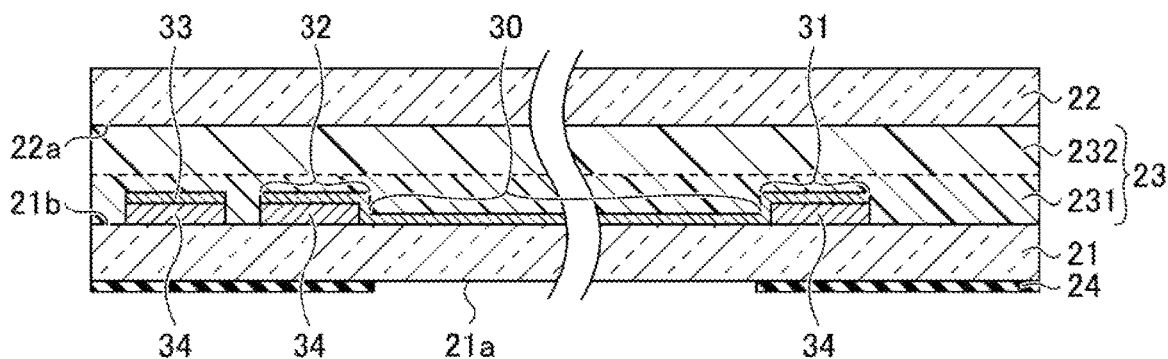

FIG. 12B is an example of changing the single-layer intermediate film 23 in FIG. 1B to the laminated structure of a first intermediate film 231 provided on the glass plate 21 side and a second intermediate film 232 provided on the glass plate 22 side. The first intermediate film 231 and the second intermediate film 232 are in contact with each other. The electrically conductive heating material 30, the first bus bar 31, the second bus bar 32, the third bus bar 33, and the fourth bus bar 34 are disposed between the first intermediate film 231 and the glass plate 21.

In FIG. 12B, the in-vehicle side surfaces of the electrically conductive heating material 30 and the fourth bus bar 34 are in contact with the out-vehicle side surface 21b of the glass plate 21. Furthermore, the in-vehicle side surfaces of the first bus bar 31, the second bus bar 32, and the third bus bar 33 are in contact with the out-vehicle side surface of the fourth bus bar 34. Furthermore, the out-vehicle side surfaces of the electrically conductive heating material 30, the first bus bar 31, the second bus bar 32, and the third bus bar 33 are in contact with the in-vehicle side surface of the first intermediate film 231.

The film thickness of the first intermediate film 231 is preferably 0.01 mm or more and 0.8 mm or less, more preferably 0.025 mm or more and 0.4 mm or less, and further preferably 0.05 mm or more and 0.1 mm or less. If the film thickness of the first intermediate film 231 is equal to or more than the lower limit, the processability and handling efficiency during manufacturing is excellent. If the film thickness of the first intermediate film 231 is equal to or less than the upper limit, heat transfer to the outside of the glass by energization is excellent.

The film thickness of the second intermediate film 232 is preferably 0.3 mm or more and 2.0 mm or less, more preferably 0.4 mm or more and 1.8 mm or less, and further preferably 0.5 mm or more and 1.5 mm or less. If the film thickness of the second intermediate film 232 is equal to or more than the lower limit, the penetration resistance is excellent. If the film thickness of the second intermediate film 232 is equal to or less than the upper limit, the weight reduction is excellent.

Young's modulus of the first intermediate film 231 is preferably larger than Young's modulus of the second intermediate film 232. Since the first intermediate film 231 has a high Young's modulus, it has rigidity and is excellent in handling efficiency even if the film thickness is thin, so that the electrically conductive heating material 30, the first bus bar 31, the second bus bar 32, the third bus bar 33, and the like can be formed accurately. On the other hand, the second intermediate film 232 satisfies performance related to safety such as penetration resistance of laminated glass by having proper flexibility. A predetermined Young's modulus of the first intermediate film 231 is obtained, for example, by reducing an amount of plasticizer to be added to the polyvinyl acetal-based resin to a small amount, or preferably without adding the plasticizer.

In order to manufacture laminated glass having a cross-sectional structure shown in FIG. 12B, first, a fourth bus bar 34 is formed on the out-vehicle side surface 21b of the glass plate 21.

Next, an electrically conductive heating material 30, a first bus bar 31, a second bus bar 32, and a third bus bar 33 are formed on the in-vehicle side surface of the first intermediate film 231. The electrically conductive heating material 30, the first bus bar 31, the second bus bar 32, and the third bus bar 33 may be integrally formed of the same material.

Next, a first intermediate film 231 is laminated on the glass plate 21 so that the out-vehicle side surface of the fourth bus bar 34 formed on the glass plate 21 and the in-vehicle side surfaces of the first bus bar 31, the second bus bar 32, and the third bus bar 33 formed on the first intermediate film 231 come into contact with each other to manufacture a first laminate. Then, a second intermediate film 232 and a glass plate 22 is further laminated successively on the first intermediate film 231 of the first laminate to manufacture a second laminate. Next, by heating and pressurizing the second laminate in a vacuum, the laminated glass having the cross-sectional structure shown in FIG. 12B can be manufactured. By heating and pressurizing in a vacuum, the first intermediate film 231 is deformed, and the in-vehicle side surface of the electrically conductive heating material 30 formed on the first intermediate film 231 is brought into contact with the out-vehicle side surface 21b of the glass plate 21.

In the above description of the manufacture of the laminated glass having the cross-sectional structure of FIG. 12B, the fourth bus bar 34 is formed on the out-vehicle side surface 21b of the glass plate 21, but this is merely an example. For example, a process may be applied such as forming an electrically conductive heating material 30, a first bus bar 31, a second bus bar 32, and a third bus bar 33 on the in-vehicle side surface of the first intermediate film 231, and forming a fourth bus bar 34 on the in-vehicle side surfaces of the first bus bar 31, the second bus bar 32, and the third bus bar 33.

Figure 12C:
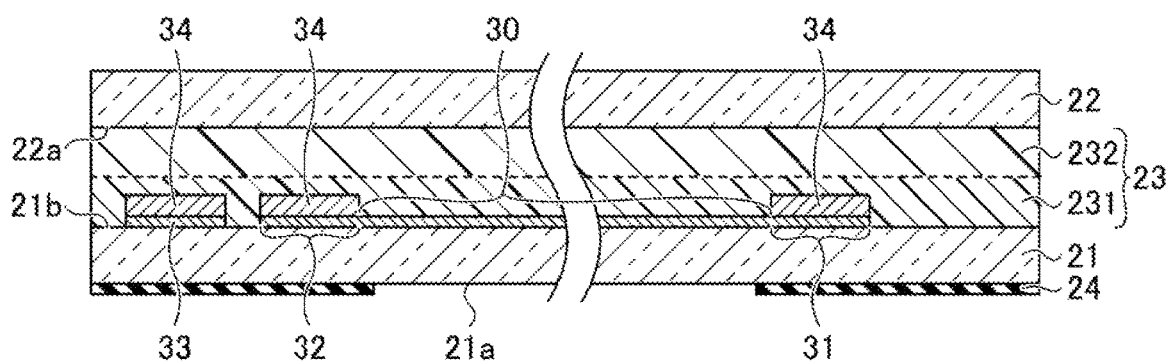

FIG. 12C is an example of changing the single-layer intermediate film 23 in FIG. 12A to the laminated structure of a first intermediate film 231 provided on the glass plate 21 side and a second intermediate film 232 provided on the glass plate 22 side. The electrically conductive heating material 30, the first bus bar 31, the second bus bar 32, the third bus bar 33, and the fourth bus bar 34 are disposed between the first intermediate film 231 and the glass plate 21.

In FIG. 12C, the in-vehicle side surfaces of the electrically conductive heating material 30, the first bus bar 31, the second bus bar 32, and the third bus bar 33 are in contact with the out-vehicle side surface 21b of the glass plate 21. Furthermore, the fourth bus bar 34 is positioned between the first bus bar 31, the second bus bar 32, and the third bus bar 33 and the first intermediate film 231, and the in-vehicle side surface of the fourth bus bar 34 is in contact with the out-vehicle side surfaces of the first bus bar 31, the second bus bar 32, and the third bus bar 33. Furthermore, the out-vehicle side surface of the electrically conductive heating material 30 and the out-vehicle side surface of the fourth bus bar 34 are in contact with the in-vehicle side surface of the first intermediate film 231.

In order to manufacture laminated glass having a cross-sectional structure shown in FIG. 12C, first, a fourth bus bar 34 is formed on the in-vehicle side surface of the first intermediate film 231.

Next, an electrically conductive heating material 30, a first bus bar 31, a second bus bar 32, and a third bus bar 33 are formed on the first intermediate film 231. At this time, the electrically conductive heating material 30 is formed on the in-vehicle side surface of the first intermediate film 231, and the first bus bar 31, the second bus bar 32, and the third bus bar 33 are formed on the in-vehicle side surface of the fourth bus bar 34. The electrically conductive heating material 30, the first bus bar 31, the second bus bar 32, and the third bus bar 33 may be integrally formed of the same material.

Next, a first intermediate film 231 is laminated on the glass plate 21 so that the out-vehicle side surface 21b of the glass plate 21 and the in-vehicle side surfaces of the first bus bar 31, the second bus bar 32, and the third bus bar 33 formed on the first intermediate film 231 come into contact with each other to manufacture a first laminate. Then, a second intermediate film 232 and a glass plate 22 is further laminated successively on the first intermediate film 231 of the first laminate to manufacture a second laminate. Next, by heating and pressurizing the second laminate in a vacuum, the laminated glass having the cross-sectional structure shown in FIG. 12C can be manufactured. By heating and pressurizing in a vacuum, the first intermediate film 231 is deformed, and the in-vehicle side surface of the electrically conductive heating material 30 formed on the first intermediate film 231 is brought into contact with the out-vehicle side surface 21b of the glass plate 21.

Figure 12D:
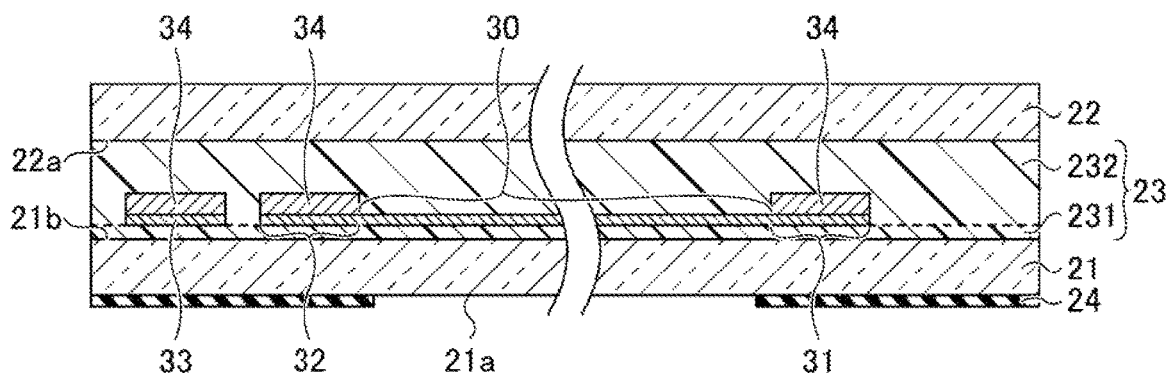

FIG. 12D is an example of changing the single-layer intermediate film 23 in FIG. 12A to the laminated structure of a first intermediate film 231 provided on the glass plate 21 side and a second intermediate film 232 provided on the glass plate 22 side. The electrically conductive heating material 30, the first bus bar 31, the second bus bar 32, the third bus bar 33, and the fourth bus bar 34 are disposed between the first intermediate film 231 and the second intermediate film 232.

In FIG. 12D, the in-vehicle side surfaces of the electrically conductive heating material 30, the first bus bar 31, the second bus bar 32, and the third bus bar 33 are in contact with the out-vehicle side surface of the first intermediate film 231. Furthermore, the fourth bus bar 34 is positioned between the first bus bar 31, the second bus bar 32, and the third bus bar 33 and the second intermediate film 232, and the in-vehicle side surface of the fourth bus bar 34 is in contact with the out-vehicle side surface of the first bus bar 31, the second bus bar 32, and the third bus bar 33. Furthermore, the out-vehicle side surface of the electrically conductive heating material 30 and the out-vehicle side surface of the fourth bus bar 34 are in contact with the in-vehicle side surface of the second intermediate film 232.

In order to manufacture laminated glass having a cross-sectional structure shown in FIG. 12D, first, an electrically conductive heating material 30, a first bus bar 31, a second bus bar 32, and a third bus bar 33 are formed on the out-vehicle side surface of the first intermediate film 231. The electrically conductive heating material 30, the first bus bar 31, the second bus bar 32, and the third bus bar 33 may be integrally formed of the same material.

Next, a fourth bus bar 34 is formed on the out-vehicle side surfaces of the first bus bar 31, the second bus bar 32, and the third bus bar 33 formed on the first intermediate film 231.

Next, a first intermediate film 231 is laminated on the glass plate 21 so that the out-vehicle side surface 21b of the glass plate 21 and the in-vehicle side surfaces of the first intermediate film 231 come into contact with each other to manufacture a first laminate. Then, a second intermediate film 232 is laminated so as to come into contact with the out-vehicle side surfaces of the electrically conductive heating material 30 and the fourth bus bar 34 formed on the first intermediate film 231 of the first laminate, and a glass plate 22 is further laminated to manufacture a second laminate. Next, by heating and pressurizing the second laminate in a vacuum, the laminated glass having the cross-sectional structure shown in FIG. 12D can be manufactured. By heating and pressurizing in a vacuum, the second intermediate film 232 is deformed, and the out-vehicle side surface of the electrically conductive heating material 30 formed on the first intermediate film 231 is brought into contact with the in-vehicle side surface of the second intermediate film 232.

In such a manner, the cross-sectional structure in the vicinity of the fourth bus bar 34 can be variously formed, and the intermediate film 23 may be a laminated structure of a plurality of intermediate films.

Although the preferred embodiments and the like have been described above, the embodiments are not limited to the above embodiments and the like, and various modifications and substitutions can be added to the above embodiments and the like without deviating from the scope stated in the claims.

For example, each embodiment and modification can be combined appropriately. For example, when the power feeding direction is horizontal as shown in FIG. 4, the area for heating by the electrically conductive heating material 30 may be divided into two or more areas.

Furthermore, in each embodiment and modification, the electrically conductive heating material 30, the first bus bar 31, the second bus bar 32, the third bus bar 33, and the fourth bus bar 34 are disposed on the glass plate 21 which is an in-vehicle side. However, the electrically conductive heating material 30, the first bus bar 31, the second bus bar 32, the third bus bar 33, and the fourth bus bar 34 may be disposed on the glass plate 22 which is an out-vehicle side. In the case of disposing the fourth bus bar 34 on the glass plate 22 which is an out-vehicle side, the fourth bus bar may be in contact with the glass plate 22.

What is claimed is:

1. Laminated glass, comprising:
a pair of glass plates facing each other;
an intermediate film positioned between the pair of glass plates;
an electrically conductive heating material positioned between the pair of glass plates and having a surface in contact with the intermediate film;
a first bus bar and a second bus bar connected to the electrically conductive heating material and positioned between the pair of glass plates, disposed such that the electrically conductive heating material is interposed between the first bus bar and the second bus bar in a plan view;
third bus bars at least partly positioned between the pair of glass plates, and connecting the first bus bar and the second bus bar to a pair of electrode leads; and
a fourth bus bar at least partly positioned between the pair of glass plates, and disposed so as to be superposed on an area of at least a part of at least one of the first bus bar, the second bus bar, and the third bus bars,
wherein the electrically conductive heating material, the first bus bar, the second bus bar, and the third bus bars are integrally formed of a same material, wherein the intermediate film includes, between the pair of glass plates, a first intermediate film having the electrically conductive heating material, the first bus bar, the second bus bar, and the third bus bars on a surface of the first intermediate film, and a second intermediate film laminated in contact with the first intermediate film.

2. The laminated glass according to claim 1, wherein the fourth bus bar is in contact with one of the pair of glass plates.

3. The laminated glass according to claim 1, wherein the fourth bus bar is positioned between at least one of the bus bars and the intermediate film.

4. The laminated glass according to claim 1, wherein the fourth bus bar is superposed on at least the third bus bars.

5. The laminated glass according to claim 1, wherein the fourth bus bar is adhered to at least one of the bus bars via at least one adhesive member selected from solder or a conductive adhesive layer.

6. The laminated glass according to claim 1, wherein the fourth bus bar is in direct contact with at least one of the bus bars.

7. The laminated glass according to claim 1, wherein each of the pair of glass plates includes a left edge portion and a right edge portion, the first bus bar is disposed along the left edge portion, and the second bus bar is disposed along the right edge portion.

8. The laminated glass according to claim 1, wherein the electrically conductive heating material includes a plurality of linear members.

9. The laminated glass according to claim 8, wherein the electrically conductive heating material is formed of the plurality of linear members in a mesh.

10. The laminated glass according to claim 8, wherein the linear member has a line width of 20 μm or less.

11. The laminated glass according to claim 1, wherein the electrically conductive heating material, the first bus bar, the second bus bar, and the third bus bars have a thickness of 20 μm or less.

12. The laminated glass according to claim 1, wherein the fourth bus bar includes one of gold, silver, copper, aluminum, and tin.

13. The laminated glass according to claim 1, wherein a thickness of the first intermediate film is 0.01 mm or more and 0.8 mm or less.

14. The laminated glass according to claim 1, comprising an information transmitting/receiving area, wherein the electrically conductive heating material is at least disposed in the information transmitting/receiving area.

\* \* \* \* \*